(12) United States Patent
Heard

(10) Patent No.: US 7,316,252 B1
(45) Date of Patent: Jan. 8, 2008

(54) MODULAR TIRE

(76) Inventor: Nathaniel Heard, 7556 Colony Palm Dr., Boynton Beach, FL (US) 33436

( * ) Notice: Subject to any disclaimer, the term of this patent is extended or adjusted under 35 U.S.C. 154(b) by 0 days.

(21) Appl. No.: 09/992,478

(22) Filed: Nov. 19, 2001

Related U.S. Application Data

(60) Provisional application No. 60/252,146, filed on Nov. 20, 2000.

(51) Int. Cl.
*B60C 5/24* (2006.01)
(52) U.S. Cl. ............... 152/334.1; 152/196; 152/333.1; 152/344.1
(58) Field of Classification Search .. 152/343.1–345.1, 152/175, 176, 169, 178, 196, 300, 301, 304, 152/316, 333.1, 334.1, 338.1–342.1
See application file for complete search history.

(56) References Cited

U.S. PATENT DOCUMENTS

| | | | | |
|---|---|---|---|---|
| 472,485 A * | 4/1892 | Phelps | ......................... | 138/140 |
| 503,560 A * | 8/1893 | Callaghan | ................ | 152/334.1 |
| 563,823 A * | 7/1896 | Veazie | ..................... | 152/334.1 |
| 764,891 A * | 7/1904 | Hequembourg | ............. | 152/60 |
| 794,372 A * | 7/1905 | May | ............................ | 152/188 |
| 855,627 A * | 6/1907 | Gayner | ....................... | 152/506 |
| 921,710 A * | 5/1909 | Jacobs | ...................... | 152/344.1 |
| 1,025,610 A * | 5/1912 | Desson | ....................... | 152/153 |
| 1,055,472 A * | 3/1913 | Keagy | ...................... | 152/340.1 |
| 1,154,817 A * | 9/1915 | Turner | ..................... | 152/334.1 |
| 1,260,651 A * | 3/1918 | Courtenay | .................. | 152/168 |
| 1,450,170 A * | 4/1923 | Clarke | ......................... | 152/156 |
| 1,569,844 A * | 1/1926 | O'Brien | ................... | 152/342.1 |
| 1,696,051 A * | 12/1928 | Orszag et al. | ........... | 152/334.1 |
| 2,196,814 A * | 4/1940 | McClay | .................. | 152/339.1 |
| 2,283,843 A * | 5/1942 | Zamora et al. | ......... | 152/334.1 |
| 3,438,419 A * | 4/1969 | Barbera | .................... | 152/338.1 |
| 4,884,609 A * | 12/1989 | Ho | ........................... | 152/337.1 |
| 6,269,855 B1 * | 8/2001 | Elgendi | ................... | 152/333.1 |

* cited by examiner

*Primary Examiner*—Geoffrey L. Knable
(74) *Attorney, Agent, or Firm*—Daniel S. Polley, P.A.

(57) ABSTRACT

A device for serving as a wheel for motor vehicles, where the wheel has its tire tread replaceable when it is worn out via unique rims and molded tire features. An alternate internal structure prevents the tire from "going flat" or "blowing out" when it is punctured or cut. In one variation the tire can be used with existing rims and can be retro-fitted into existing tire by mating the tires with this invention's "Non-Flat Tire" internal element and special rim. A variation of the "Non-Flat Tire" system uses spring-like materials for its tire core that is shaped similar to a tire's inner tube, and functions like an "air-filled" tire, but the absence of the use of air in this unique configuration gives it the "Flat Tire Prevention" effect.

14 Claims, 26 Drawing Sheets

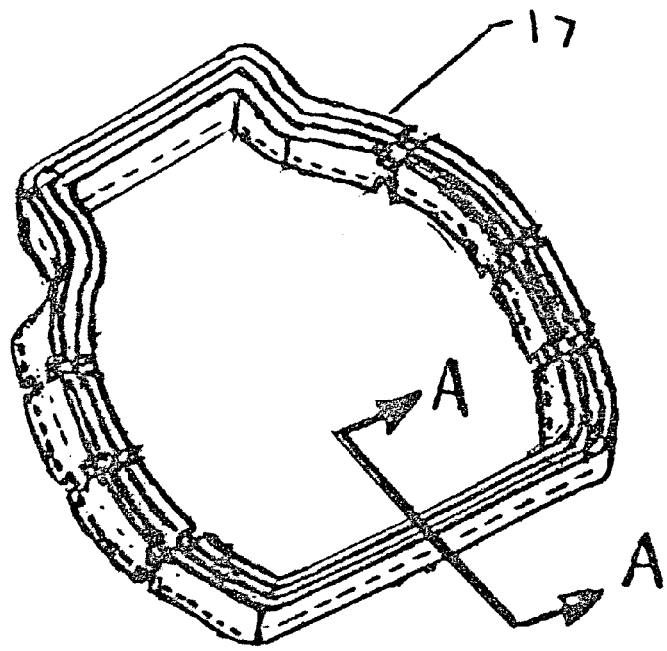
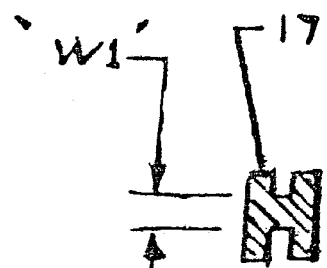
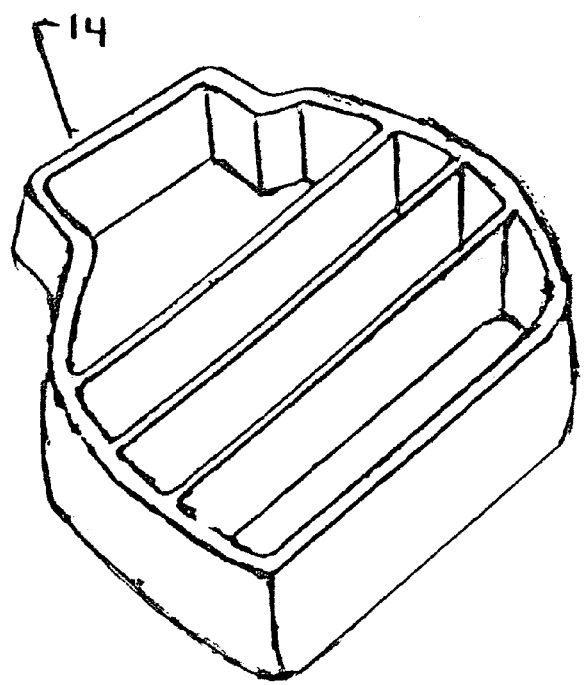
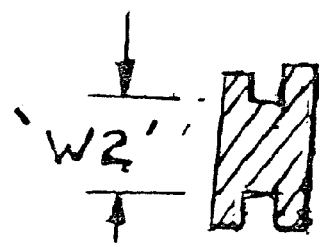
FIGURE 7B
FIGURE 7C
SECTION A-A
FIGURE 7D

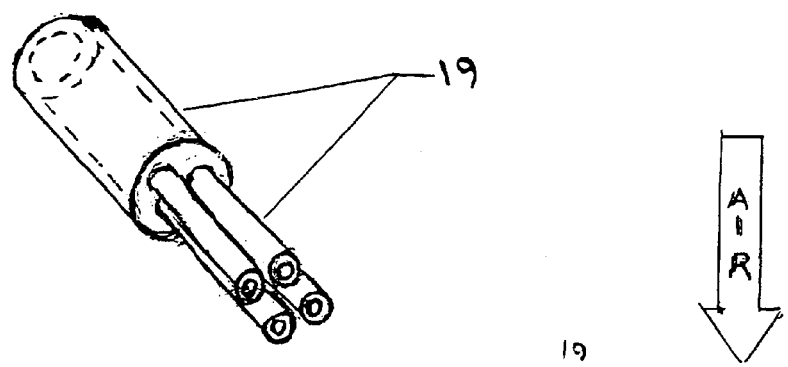
FIGURE 8
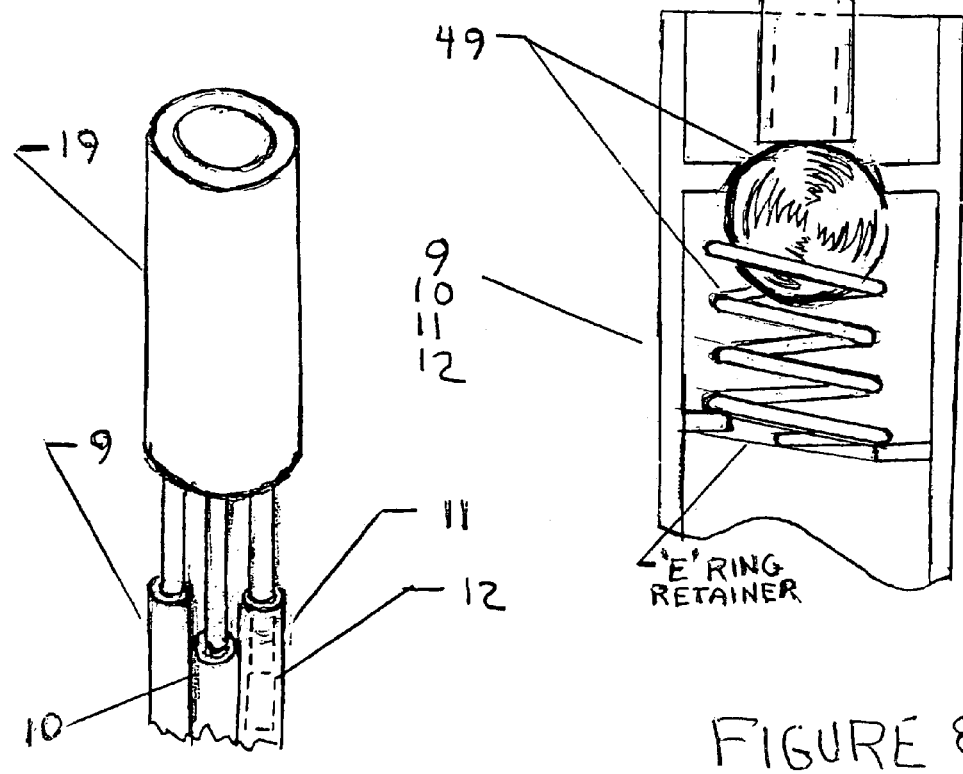
FIGURE 8A
FIGURE 8B

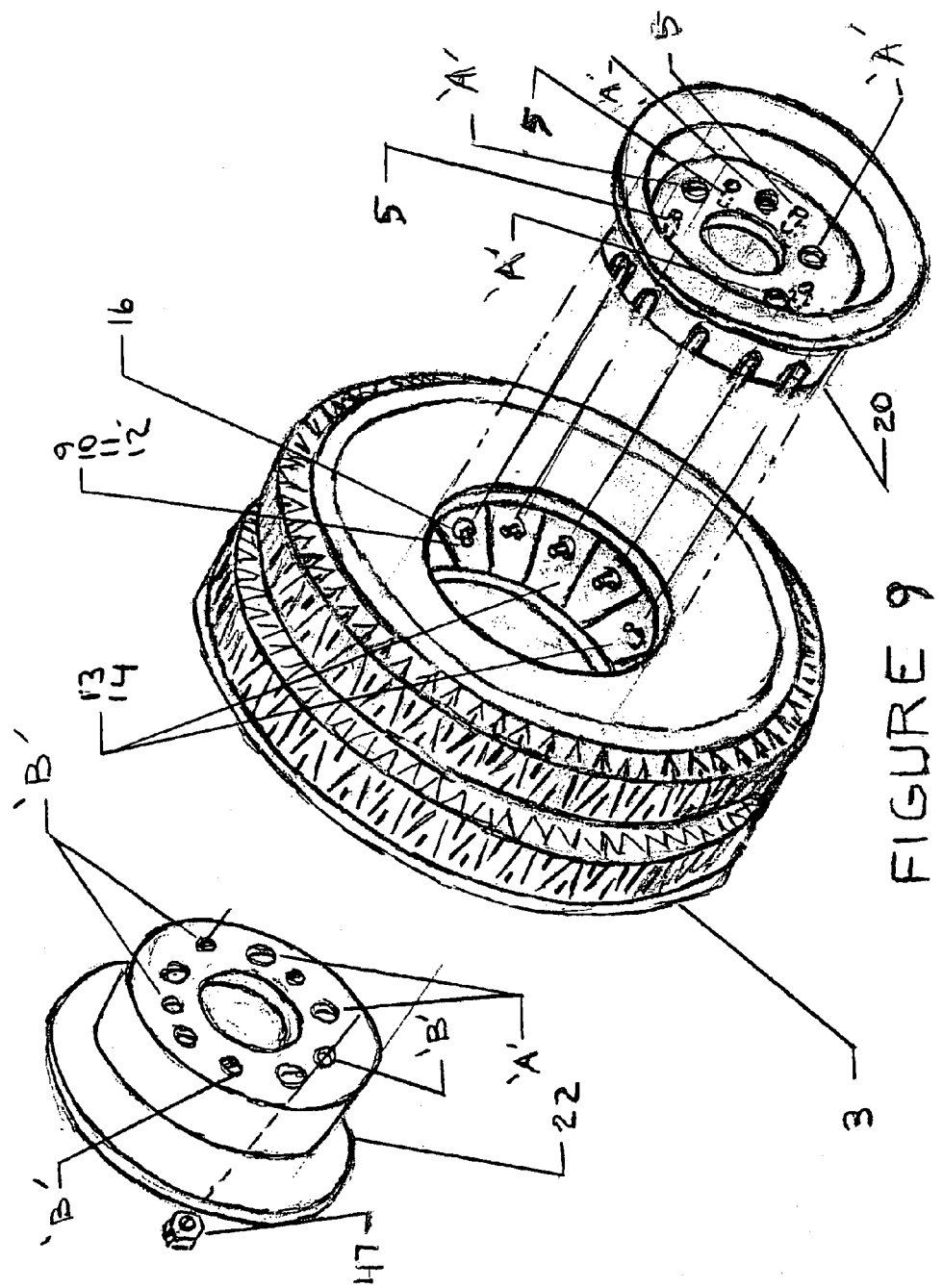

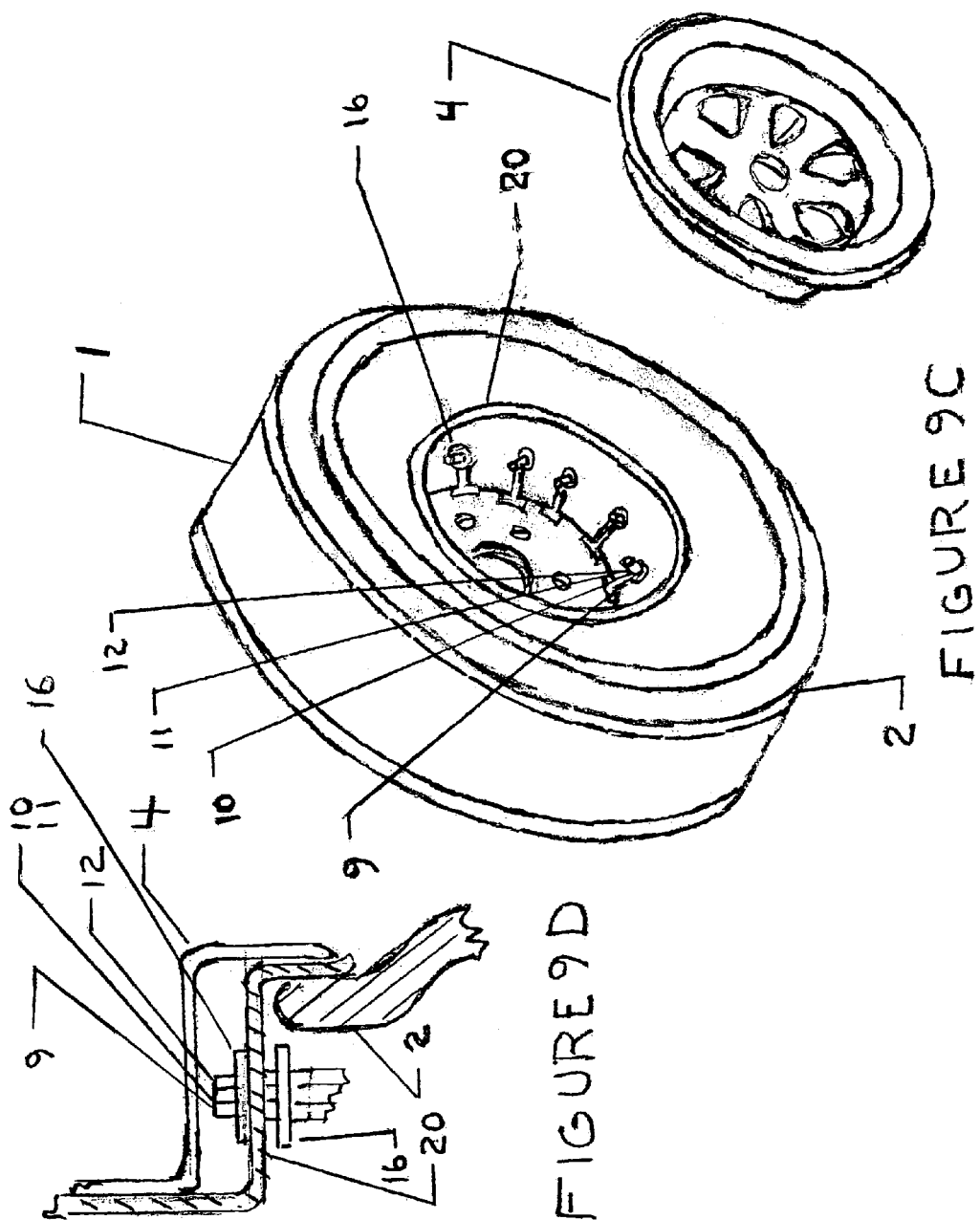

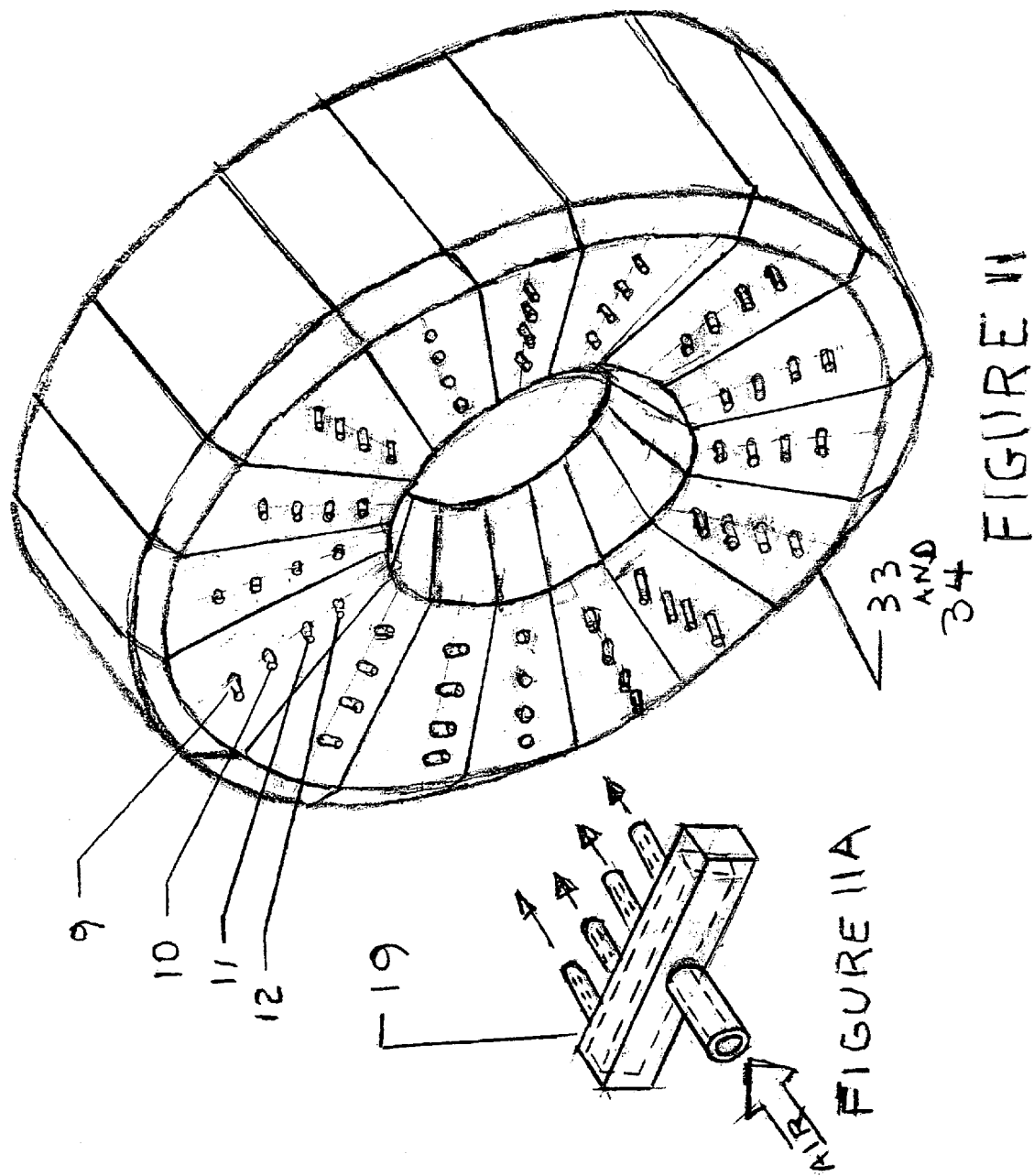

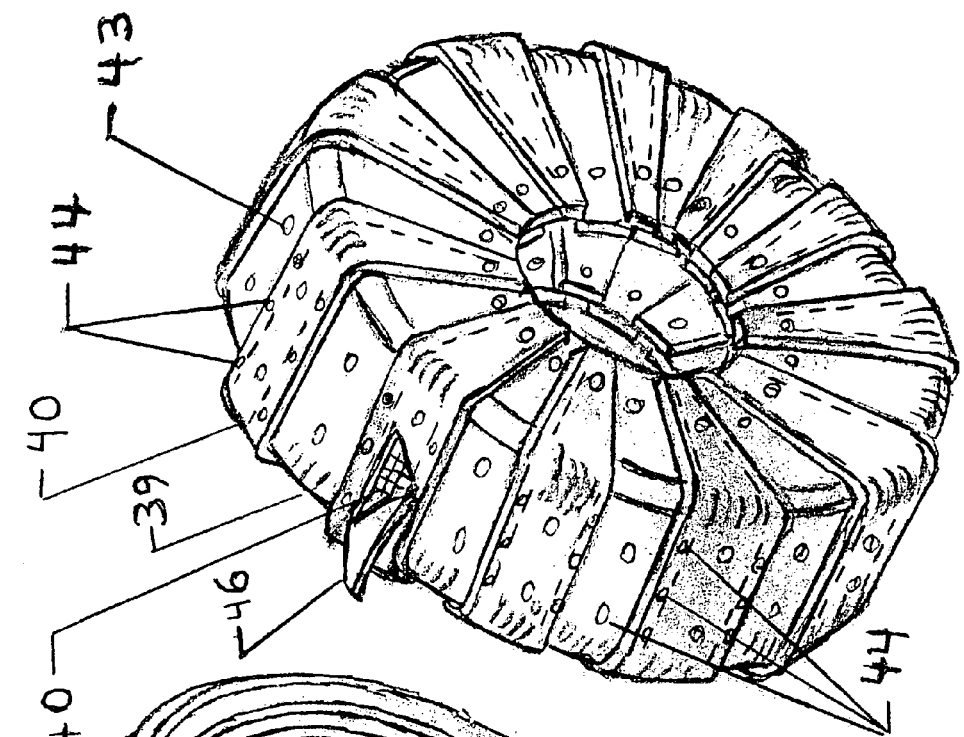
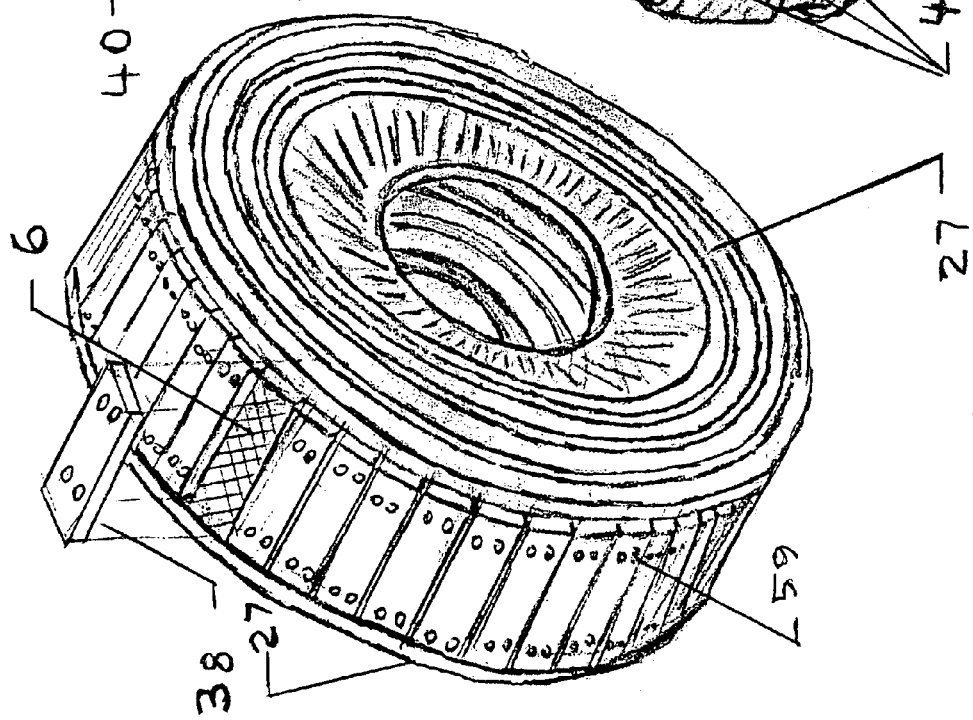
FIGURE 12B
FIGURE 12A

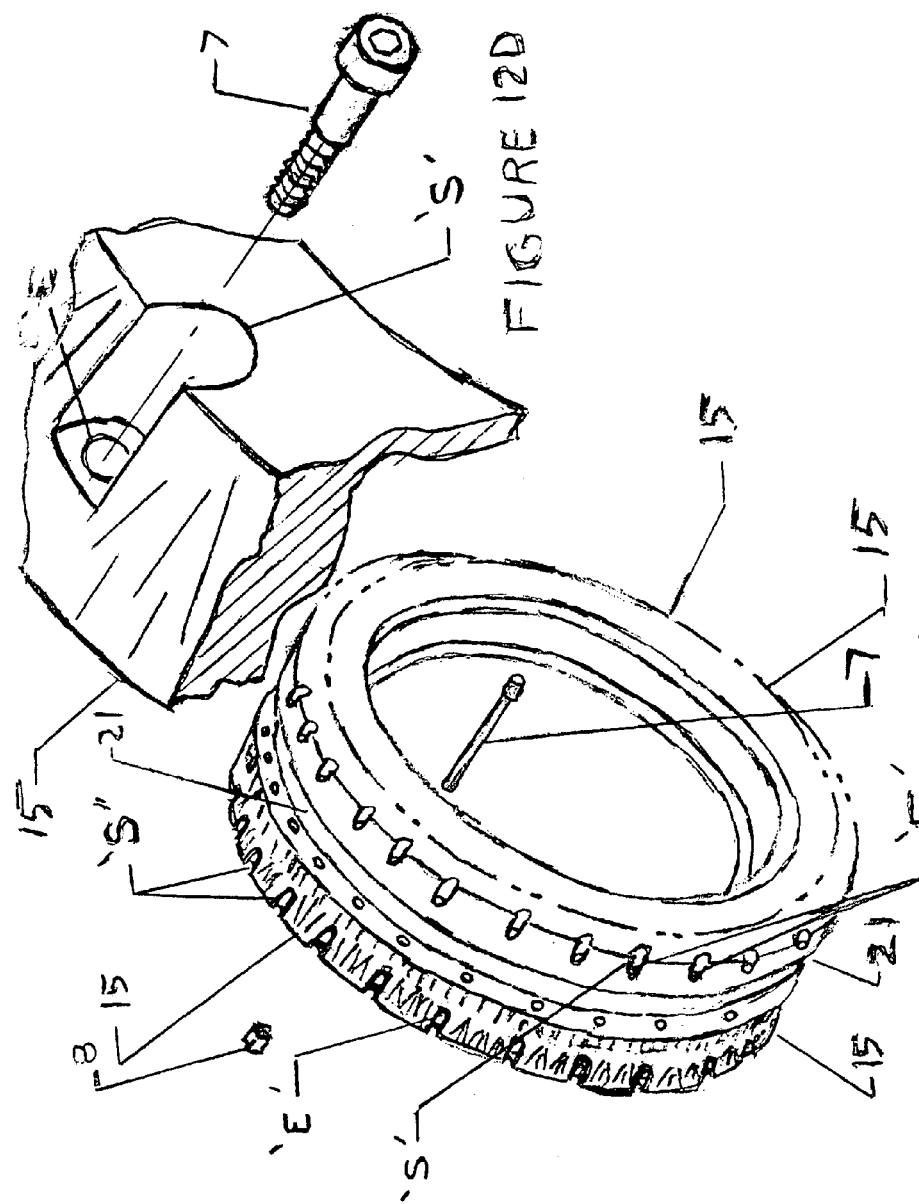

MODULAR TIRE

This application claims priority to and the benefit of U.S. Application Ser. No. 60/252,146, filed Nov. 20, 2000.

BACKGROUND OF THE INVENTION

1. Field of the Invention

The invention relates to an apparatus for the enhancement of Motor Vehicle tires, in the areas of safer operation, greater reliability, better motor vehicle fuel economy, and conservation/up-grading of tire-construction materials.

2. Description of Prior Art

Existing tires have several "Anti-Flat Tire" devices available to Consumers, ranging from "Tire Within a Tire" devices, internal tire wall "Puncture Sealant", and "Rigid Side Wall" structural elements. Existing tires with "Rigid Side Walls" to keep the tire from going "flat" allow driving a vehicle with these tires, only to be driven a short distance at low speeds. In addition, existing "Tire within a Tire" designs only permit the driver to reach a destination to get assistance, when the tire is damaged to the point of "air loss". In those circumstances, the tire is usually non-repairable and must be replaced. The present invention exceeds existing "Anti-Flat Tire" designs by permitting air loss from punctures to occur only at the location of the puncture, by having a vast number of independent "Air Cells" that far outnumber those of existing tire designs. The present invention has the advantage over existing tires with "Rigid Side Wall" aspects, where this invention uses "Modular" components such as independent "Rigid Side Walls" that allow them to be removed to be repaired or replaced. Every element of the "Modular" tire, such as the "Air Cell"/Inner Tube Segments, "Side Walls", rims, and tire tread can be repaired or replaced, on a regular basis. This is the purpose and intent of this invention, meaning it is a "Life Time" component having only the parts that wear, such as the tire tread replaced when worn. Most punctures in the tires don't even have to be replaced because the air loss is "local" and minimal, with respect to the overall function of the tire. Existing tires often burn in accidents, and cause a great deal of flame because of their large amount of combustible material. Certain variations of the present invention use only a small amount of rubber, being the tire tread, as compared to existing tires that are basically all rubber.

One variation of the invention that uses spring-like structures that simulate the shape of a tire has been previously used by NASA on the Lunar Rover, where this vehicle was an electric car that transported the Astronauts over the moon's surface. The present invention uses this concept for a tire combined with a rubber tire tread that is installed over the part of the wheel that contacts the pavement (usually Asphalt), used on existing highways.

BRIEF SUMMARY OF THE INVENTION

A Motor Vehicle (and in some variations Aircraft) tire that will not go flat when cut or punctured. This feature is included with a feature that allows the consumer to keep the tire after the tire tread is worn, and only replace the tread, to continue using the tire. This is done by building the tire in a "Modular" fashion, where the tires "side wall", tire tread, inner tube, air valve, and accompanying rim are separate components, that inter-lock on assembly, to make up the complete wheel. The various types of "inner tubes" used with this "Modular" tire envelope are: individual inner tube segments (approximately 15 sections) that have optional independent air chambers inside each segment. The air chambers may number from 1 to approximately 12 per inner tube segment, except when an "Air Cell" or "Closed Cell Foam elastomeric material (or equivalent) is used. These "Air Cells" are stuffed inside the tire casing. A unique two-piece rim is installed onto the tire by placing the inside diameter of the rim through the mating opening in the tire. The rim is uniquely split in half so that one half of the rim goes into the tire through the hole of its inside "side wall", and the mating half of the rim passes through the hole in the tire's outside "side wall". The two halves of the rim are then bolted together through a set of mating holes that coincide when the rim halves "bottom" on the tires "side walls", which simultaneously cause the rim's hubs to meet "surface-to-surface". One variation of the "split rim" concept causes the rims and tire's side walls to "squeeze" an inner tube-like core that fills the inside (volume) of the tire. This inner tube is filled with a myriad of "air chambers" that render the inner tube "oversized" with respect to the inside volume of the tire. The individual side walls if the tire, combined with over-lapping bands that match the shape of the tire's tread, allow the "modular" tire tread, individual side walls, and split rims to form a larger volume for the tire to accept the "over-sized inner tube". The entire assembly is "squeezed" down to its normal tire size. Only the "girth" of the inner tube is squeezed because the rest of the inner tube is constrained within the diameter of the tire's tread. The tire reaches its proper inflation pressure via reducing its volume (squeezing its girth) to its "design volume". The squeezing is done via a Hydraulic Press, or equivalent device. The final volume {"design volume") is secured via "special" bolts passing through a circular set of holes in hubs of the rims/mating holes in the side walls, and a circular set of "outboard" holes passing through the tire's side walls, at their outer edge/mating with holes through the tire tread (in a transverse direction). The bolts that clamp this assembly ("sandwich") together have Acme Threads, or equivalent, that locks the assembly together. These bolts also provide some adjustment of the resulting tire pressure by tightening or loosening the clamped assembly, using a tool to turn these bolts.

Another variation of the Modular Tire that is similar to the one that uses "Air Cells" that are "squeezed" to effectuate inflation pressure, is one having inflatable inner tube segments, where these segments have individually inflatable "cells". Each of these inner tube segment's "Air Cells" have a system of "air filler valves" that pass through the tire's rim. A novel/special air filler nozzle, having an air distribution manifold built into it, fills groups of the tires inner tube segments, simultaneously. This same device can be used to deflate these segments because the "air valves" of each segment have Check Valve components inside them. To inflate the tire, the tire's casing is filled with these inner tube segments (approximately 15 units), that form the shape of a typical inner tube. The tires split rims are then installed. These rims have slots located around its perimeter, that correspond to the pattern formed by the air valves emanating from the inner tube segments. These air valves (approximately 15 "valve stems") pass through the slots in the tire's rim. The hubs of the rims are bolted together, "surface-to-surface, via studs located in one half of the rim, and nuts that that engage these studs which pass through the hub of the other half of the rim. The aforementioned inflation tool has an Air Pressure gauge integrated into its construction, that indicates the pressure of each individual "Air Cell" within each inner tube segment. Filling all of the inner tube segments to the prescribed pressure is equivalent to filling a conventional tire to its required pressure, per the contemplated design of the "Air Cells".

A similar variation of the invention is a tire having similar inner tube segments, except its "air filler valves" pass through the in-board side walls of the tire. This allows the consumer to use standard/existing rims. The "air filler valves" passing through the surface of the in-board side wall of the tire are not significantly visible, because that particular side wall is made thick enough to hide most of the valve. Only a small amount of the valve is needed near the surface of the side wall in order to allow the air filler nozzle to be inserted into the inner tube segments' "valve stems", during the inflation process. The inflation tool is used only when the tire is being assembled.

A variation of the invention used as a wheel that is similar to the spring-like wheels used on the Lunar Rover also exists. This variation involves having each of the tire's side wall and one half of its tread molded together. These two halves of the tire go together in a "clam-shell-like" combination to cover the wheel/inner-tube-like structure formed from coiled spring-like material. The aforementioned molded covering is equivalent to splitting a standard tire in half, and adding a pattern of radial "fins": onto the inside surfaces of the tire's side walls. These internal "fins" combined with corresponding set of "grooves" are added to the inside surface of the tire's tread area. The combination of these "fins" and "grooves" are arranged to match and inter-lock with the edges of the spring-like inner tube. This feature makes the spring-like inner tube "drive" the tire similar to the way mating gears "drive" each other.

This entire assembly is attached to a rim that is also "driven" when the rim is attached to the vehicles' axle. The rim is attached to the enter of spring-like inner tube, where its combination resembles the "skeleton" of a tier/wheel assembly. This variation of the invention also involves using unique materials for its spring-like inner tube structure. These materials are: Vulcanized Fiber, Spring Tempered metals such as Steel/Stainless Steel/Beryllium Copper/etc., Polycarbonate (Lexan), Kevlar, Flexible Epoxies, and the like. The Plastic and Vulcanized Fiber material would have an Aluminum foil covering laminated to their surfaces to render them "Fire Proof", or they may be painted with "Fire Proof Paint" that has been recently developed. These structures would vary in wall thickness, with regard to the vehicle's weight and maximum allowable deflection of the tire when it hits bumps or other road obstacles. The plastic "inner tubes" that make up this part of the invention would be molded or formed to have a "memory" and other retention properties that make it keep its shape in contemplated weather and driving conditions.

Thus, the present invention provides a device for serving as a wheel for motor vehicles such as a car or truck, and in some cases an Air Craft, where this wheel has the novel features of having its tire tread replaceable when it is worn out via its unique rims and molded tire features. The tire has an alternate feature of a unique internal structure that prevents the tire from "going flat" or "blowing out" when it is punctured or cut. The tire has one variation of its configuration that allows it to be used with a Consumer's existing rims. Another novel feature of the tire's "Non-Flat Tire" system(s) is it can be retrofitted into a consumer's existing tire by mating the consumer's tires with this invention's "Non-Flat Tire" internal element and special rim. The invention includes a variation of its "Non-Flat Tire" system, using novel spring-like materials for its tire core that is shaped similar to a tire's inner tube, and functions like an "air-filled" tire, but the absence of the use of air in this unique configuration gives it the "Flat Tire Prevention" effect. The variation using the spring-material as an inner tube can be assisted by an inner tube device containing a myriad if "Air Cells", because the inner tube made of spring-like material is hollow, thus allowing a supplemental inner tube-type device containing "Air Cells" can be fitted inside. Some variations of the invention are unlike existing tires, where this novel tire has "side walls" that are made from elastic materials that do not rupture on impact and do not burn. These "side walls" are considered to be lighter than those of existing tires, less expensive, and re-useable/repairable. They are capable of accepting many novel hues and colors. The various tires in this invention appear to have "Vandal Proof" properties, and are safer than existing tires because they do not "blow-out", because they have a collection of individual "Cells" of air, that are considerably more numerous than the air chamber of conventional tires, and in some variations of the invention, use no air at all. This invention is composed of a tire that is "modular", where the consumer can "design" the properties of the tire, meaning the tire tread pattern can be inter-changed to accommodate various road conditions (i.e. Mud and Snow tread, "Rain Tire" tread, "High Speed Driving" tread, and the like). The invention also provides "Conservation" capabilities, with respect to saving materials by facilitating the repair/re-manufacturing of its tread and "Air Chambers", repeatedly. The invention has one variation that has a mechanical system that generates its "Tire Inflation Pressure" by appropriately reducing the tires overall "Air Chamber" volume, during the assembling of the tire to the rim.

BRIEF DESCRIPTION OF THE DRAWINGS

FIGS. 7B, 7C and 7D Show the aspects of the air seal that bonds the two halves of the inner tube segments together.

FIGS. 8/8A/8B show the inner tube segment's air inflation tool, and the air check valves in the tube's valve stem.

FIG. 9 shows the total tire, having its inner and outer side walls, tread, inflatable inner tube segments, and split rim.

FIGS. 9C and 9D show how the array of air filler valves is covered by a decorative cover that is attached over the rim.

FIG. 11 shows a variation of the inflatable inner tube segments that have its air filler valve stems on the side of the of the inner tube segments, to allow filling them with air though mating holes in the side walls of the tire.

FIG. 11A shows the inflation tool used in the configuration of the inner tube segments having valve stems on its side.

FIG. 12 A shows the invention with treads that can be replaced that are bolted or pop-riveted onto a Modular tire casing that is made from molded/flexible plastic or metal, that flexes in accordance to road conditions.

FIG. 12B shows a Modular tire casing constructed similar to the wheels used in the Lunar Rover, Built by NASA.

FIGS. 12C and 12D shows a Modular Tire in a "Clam Shell" configuration, and how it is bolted together.

PREFERRED EMBODIMENT OF THE INVENTION

Figure 1:
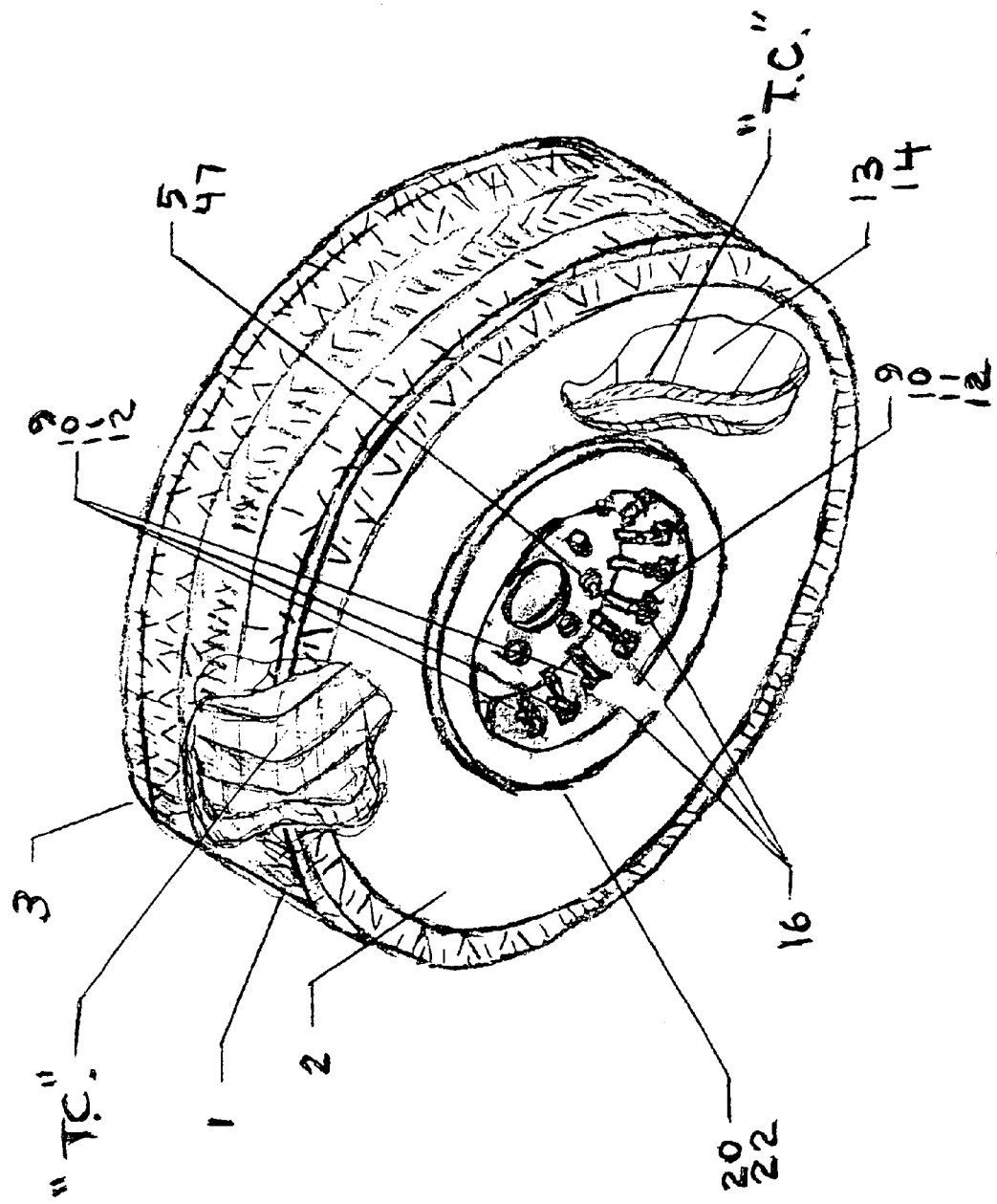
FIG. 1 shows the Modular tire assembled, with its basic components, being its split rim, side walls, and tire tread.

Referring now to the drawings and in particular FIG. 1, the present invention is shown generally comprised of the replaceable tire tread 1 captured by the tire's side walls 2 and 3 making up the tire casing, which is filled with inflatable inner tube segments 13 and 14, where the assembly is clamped together by its split rims 20 and 22 having rim-mounted studs 5 and their associated nuts 47 clamping the split rim hubs together. This figure also shows the inflatable inner tube segment's air filler valve stems 9, 10, 11, and 12 passing through slots in the split rim, where the valve stems are held upright and secured by their collars 16 that are bonded to the valve stems.

Figure 2:
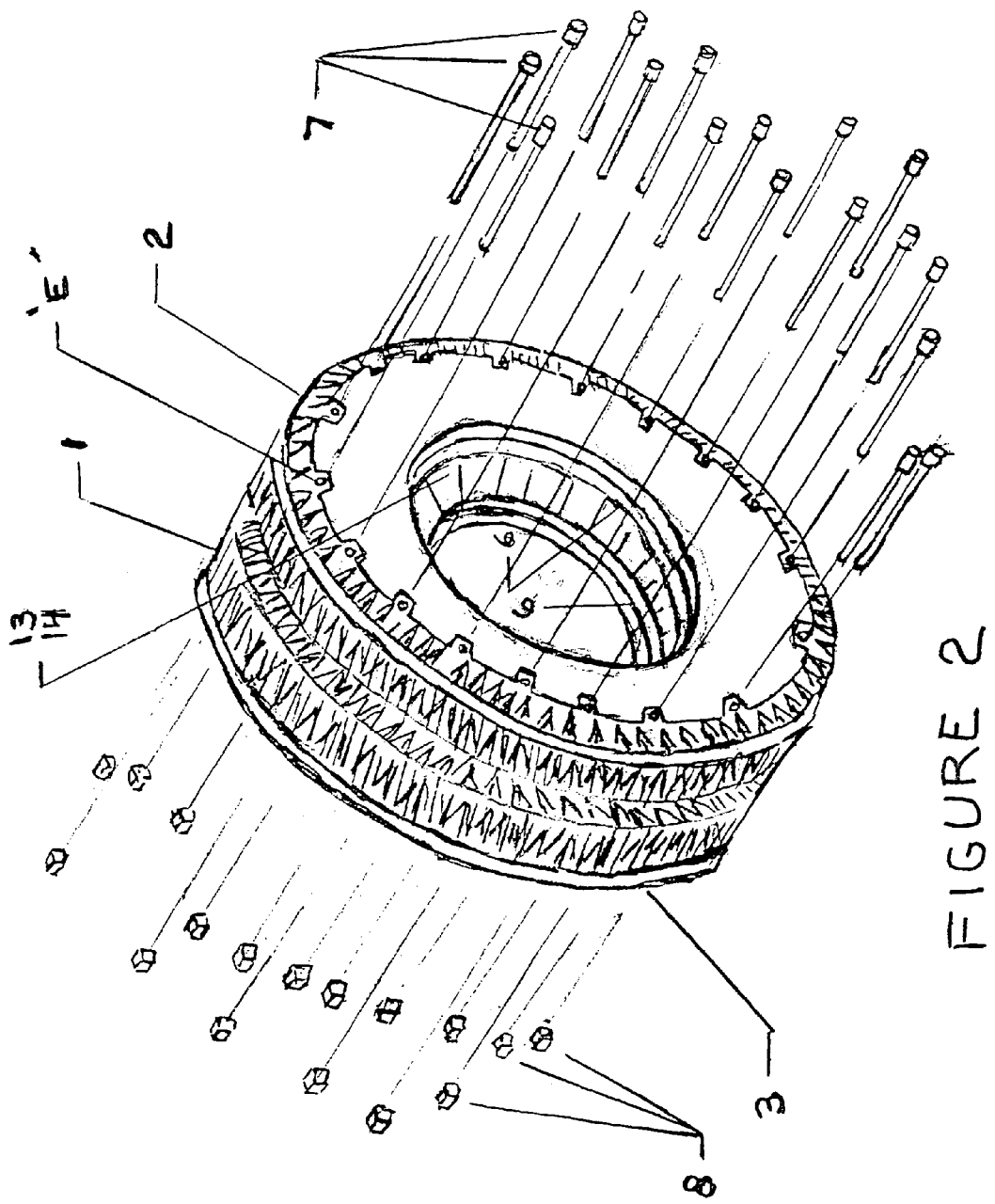
FIG. 2 shows how the side walls are bolted to the tire tread, using long bolts through the tread and captive nuts.

FIG. 2 shows the Modular tire with its tread 1 clamped to the tire's side walls 2 and 3, using through bolts 7 and their mating captive nuts 8 that are pressed into a hole pattern around the circumference of the side wall 3, being on the same axis as the bolt holes for 7 that pass transversely through the tire tread. The figure shows the inflatable inner tube segments 13, 14, or 22 and 23, installed inside of the tire casing.

Figure 3:
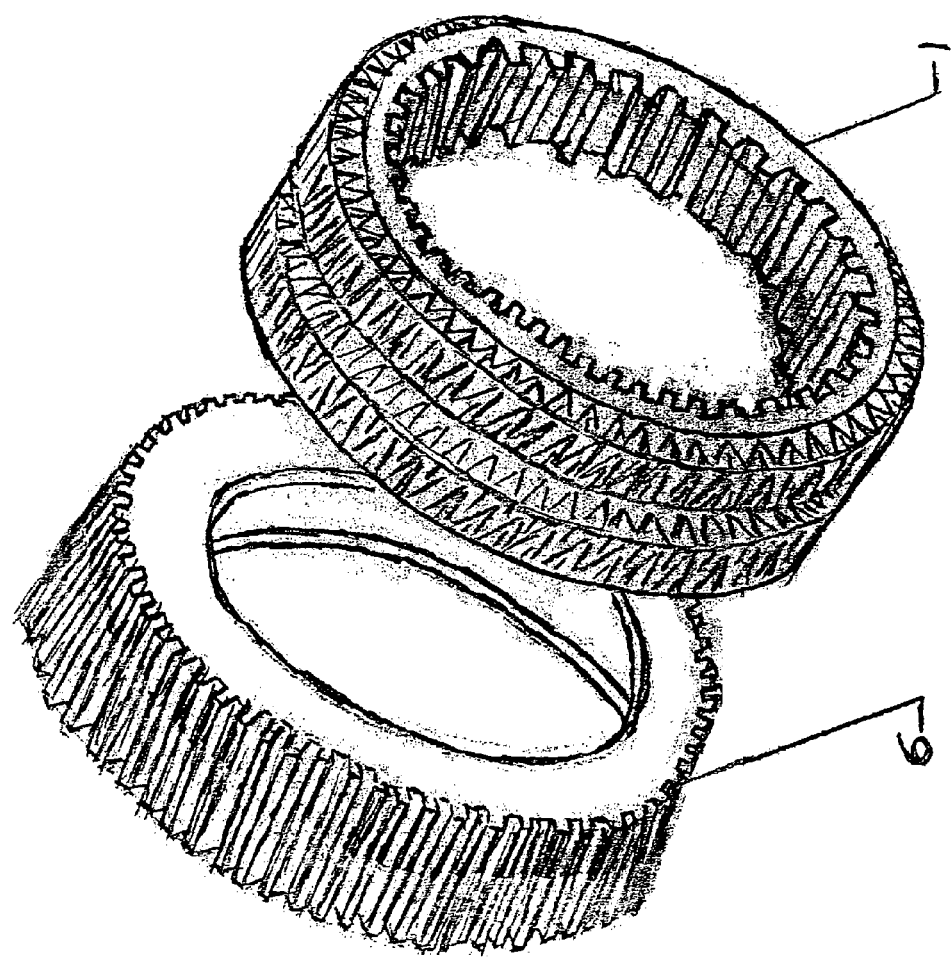
FIG. 3 shows the novel tire casing with "grooves" around its circumference, along with the mating tire tread.

FIG. 3 shows a variation of the invention's the tire casing 6 that has grooves molded transversely around its circumference, that mate with grooves that are molded onto the inside surface of the tires replaceable tread 1, where these grooves prevent the tread from slipping at the tread/casing interface, when the tire is operating on a vehicle. The tire casing can be made of unique flexible materials and its shape molded by cost-effective molding processes. Examples of this novel situation would be tire casings made by Injection Molded plastics like Polycarbonate (Lexan) or Hydro-formed metals that are spring tempered, or molded fabrics impregnated with flexible resins, where the non-metal shapes can be made "Fire Proof" by laminating a ductile foil "skin" like Aluminum Foil 46 onto their structure.

Figure 4:
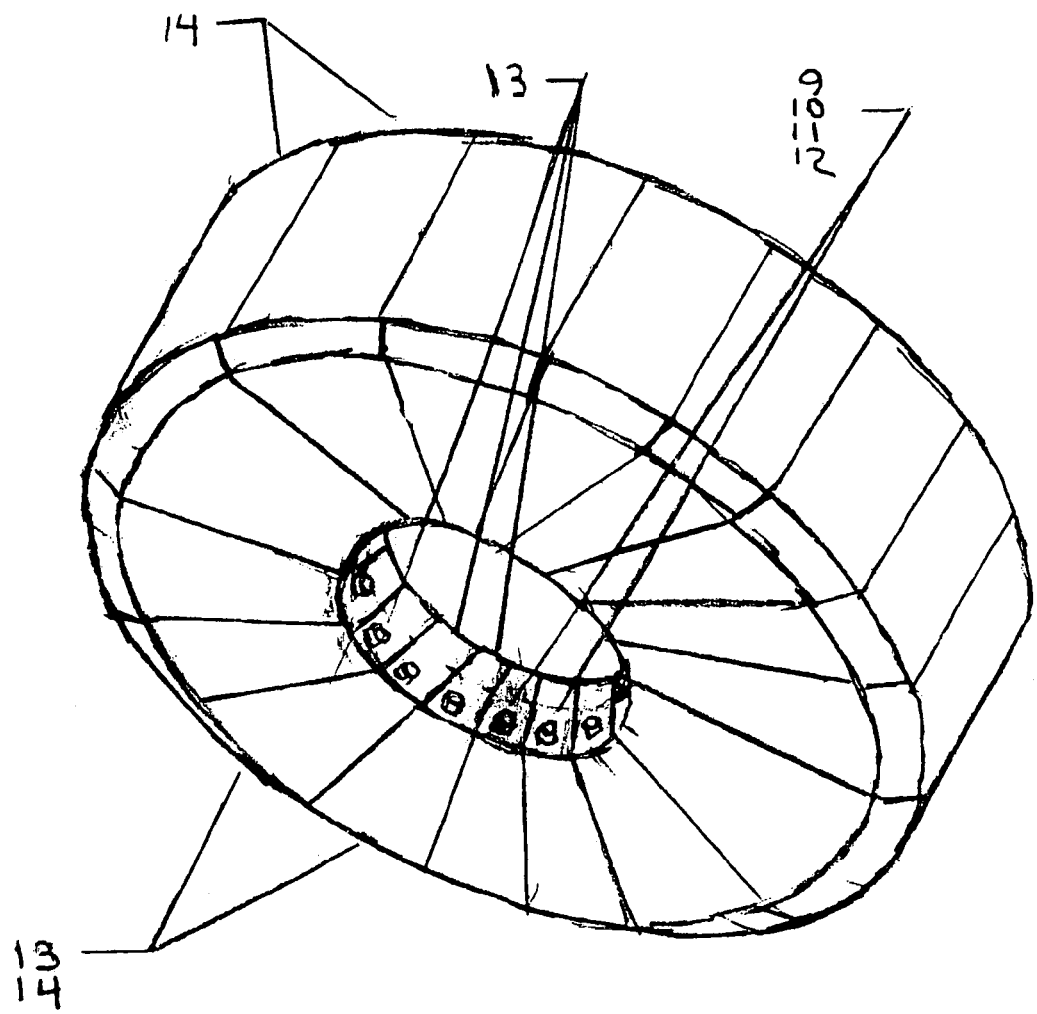
FIG. 4 shows a variation of the tire's "Anti-Flat Tire" system, using individually inflatable inner tube segments.

FIG. 4 shows the shape that the array of inflatable inner tube segments 13 and 14 take, when they are installed inside of the tire casing. It also shows the cluster of the inflatable inner tube's air filler valve stems 9, 10, 11, and 12, located around the inside diameter of the circular inner tube segment array.

Figure 5:
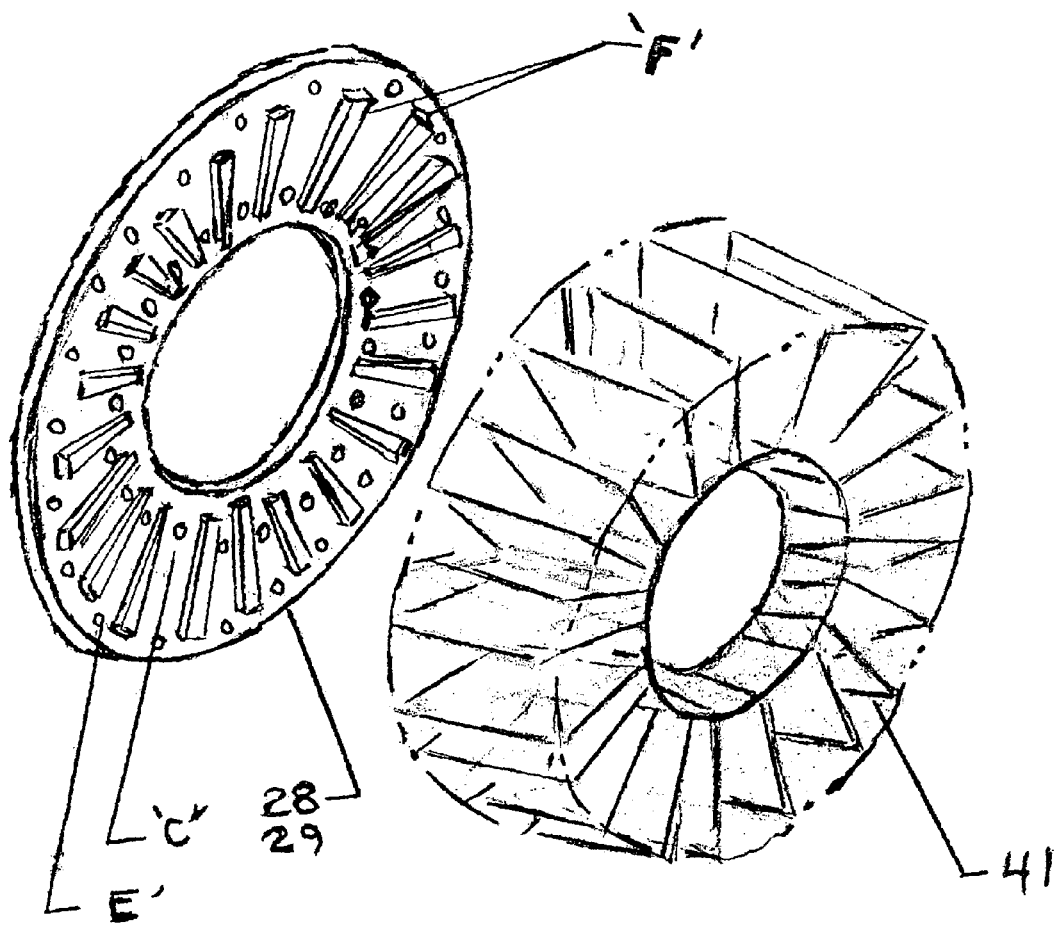
FIG. 5 shows the inner tube made of spring-like material, and the tire's side wall with "fins" that lock into the tube.

FIG. 5 shows an inner tube made from spring-like material 39 and 40 similar to the wheels of the Lunar Rover, and the Modular tire's side walls 28 and 29, that have fins "F" that grip the "inner tube-like" structure to prevent it from slipping when the tire is driven by a vehicle. The inner tube-like structure may also consist of a material made of molded "Air Cells" 19 having similar circular geometry that is clamped between the Modular tire's side walls 28 and 29, to form the body of the tire. This assembly is bolted together, along with the tire's replaceable tread through the "C" and "E" holes in the side walls that match up with holes in the tire's replaceable tread.

Figure 5A:
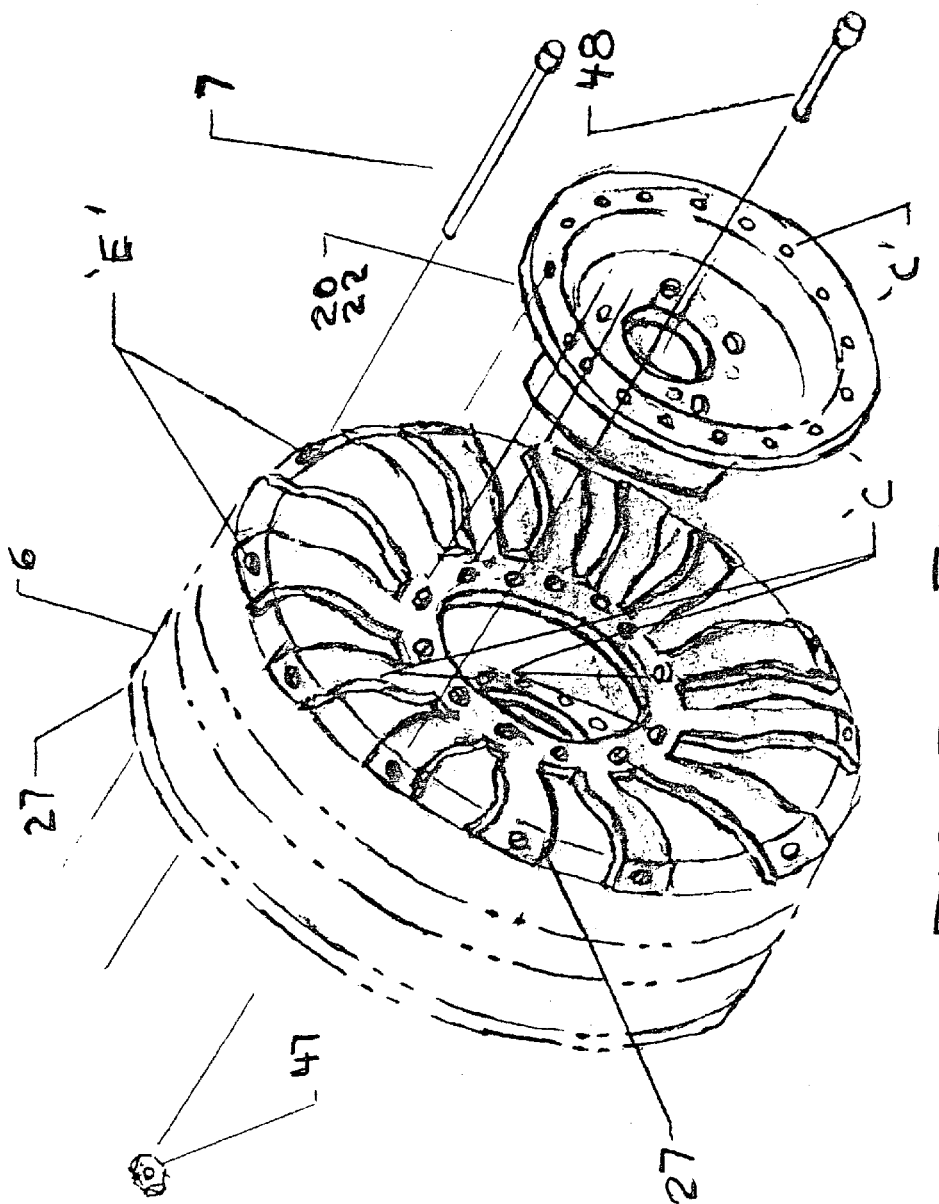
FIG. 5A shows a variation of the spring-like inner tube, where the structure serves as the tire's side wall, as well.

FIG. 5A shows a inner tube-like/side wall structure made from flexible spring-like plastic or metal material 27, that is clamped to the Modular Tire's replaceable tread 6, through the "E" holes using the through bolts 7 to secure the side walls to the tire tread, along with through bolts 48 and their mating nuts 49, passing through the "C" holes that clamp the two halves of the tire's rims 20 and 22 to the same inner tube/side wall structure.

Figure 6:
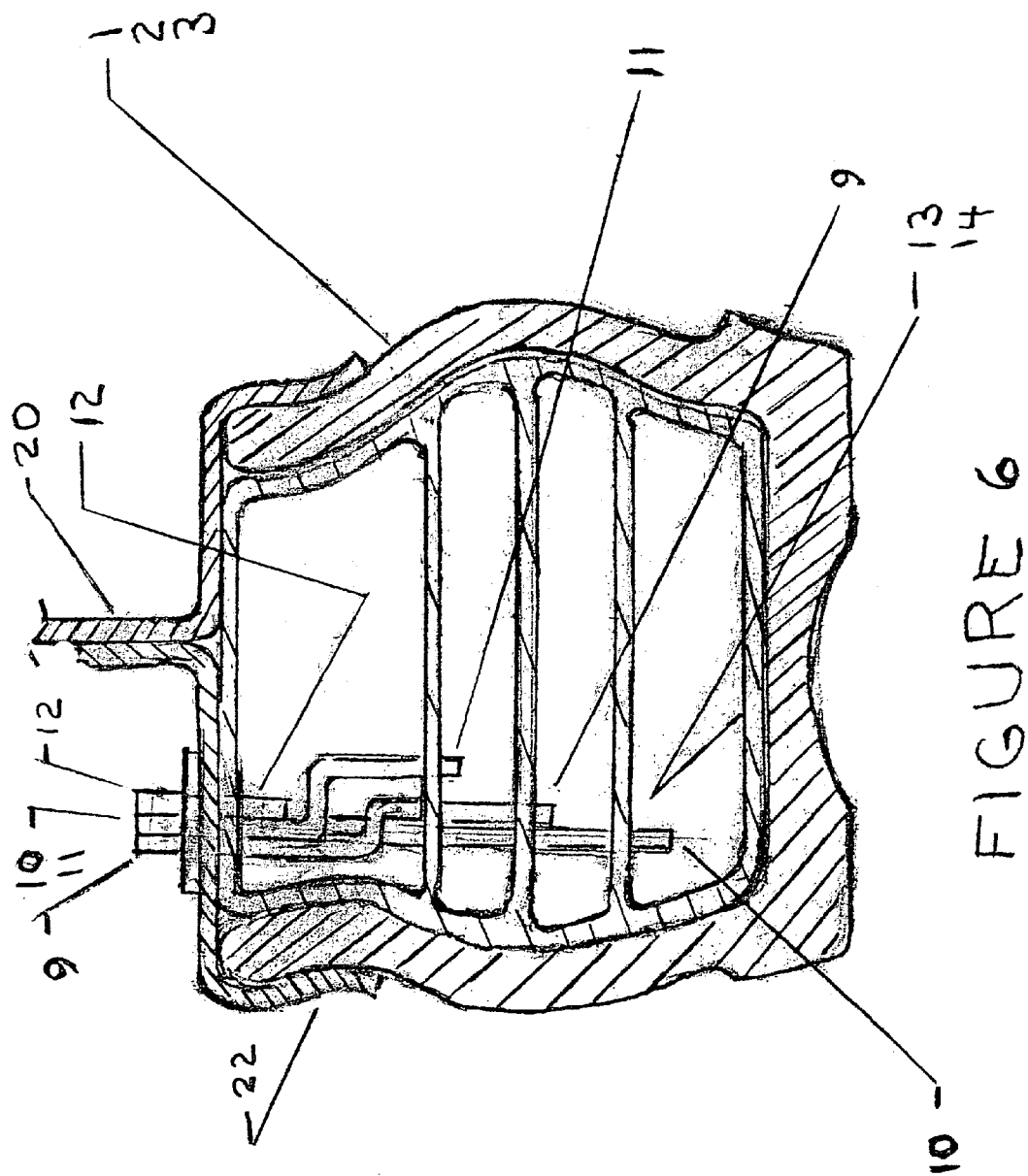
FIG. 6 shows a cross section of the Modular Tire, or a conventional tire, with the inflatable inner tube segment and its unique Split Rim that allow the air filler valve to pass through the rim.

FIG. 6 shows a variation of the invention that uses an inner tube segments 13 and 14 having independent inflatable chambers that use a valve stem assembly which has independent air valves 9, 10, 11, and 12 for each air chamber. This figure shows a cross section of the components around the inner tube segments, being the side walls and replaceable tire tread 1, 2, and 3, respectively that are held by the split rims 20 and 22 through bolting these rims together at the surface of their hubs, where the assembly comprises the Modular Tire.

Figure 7:
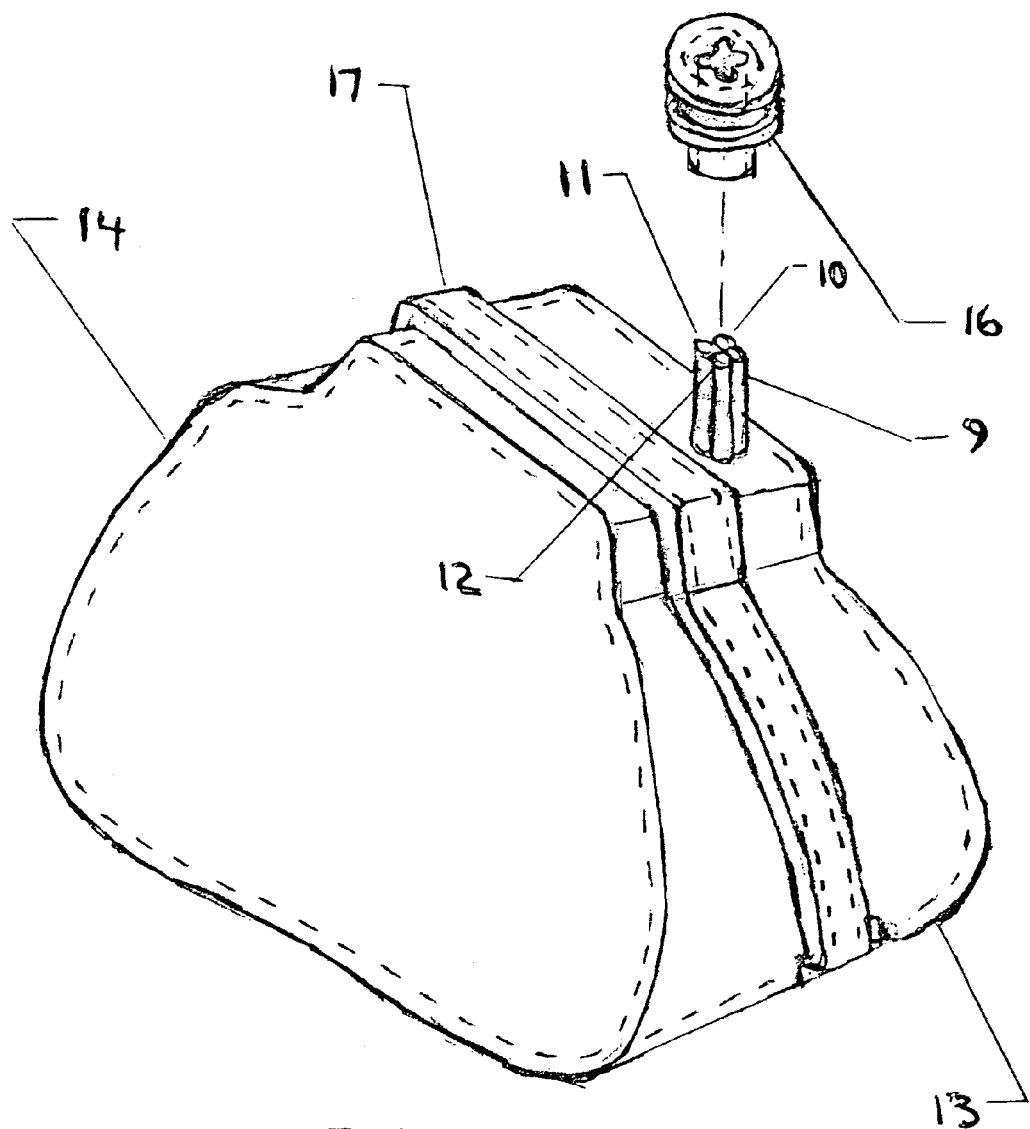
FIG. 7 shows a typical inflatable inner tube segment that fits inside the tire casing, plus its "air filler valve", and seal.
Figure 7A:
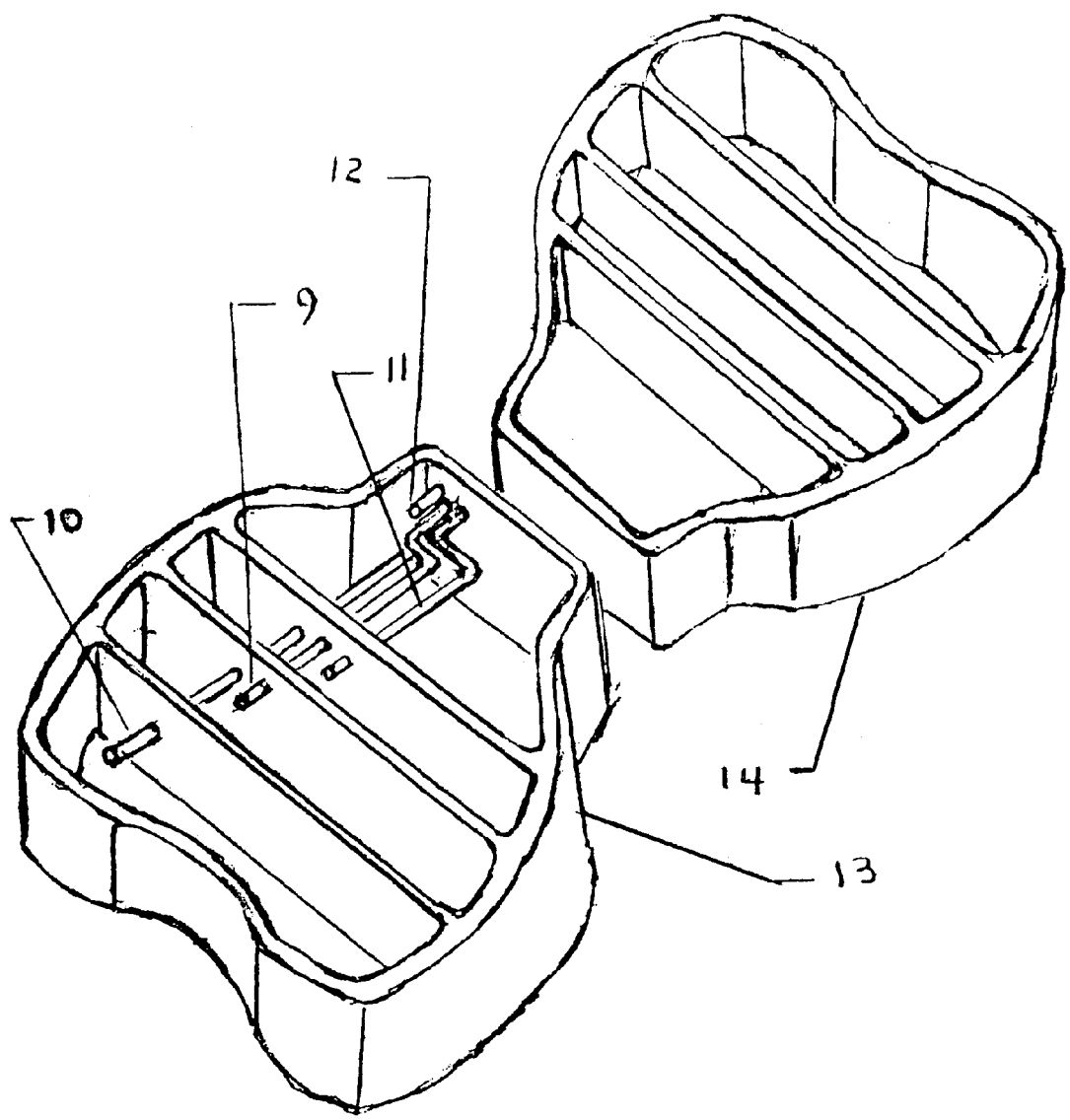
FIG. 7A shows the inner tune segment with individually inflatable air chambers and their "air filler valves" within.

FIGS. 7 and 7A Show the inner tube segment's components, consisting of left and right air chamber segments 13 and 14 with air filler valves 9, 10, 11, and 12 appropriately located and bonded to the air chamber segment, along with converting the air chamber segments into a closed volume via the seal 17 that fits over the edges of the air chamber segments, and bonded to them. The assembly has a collar 16 that is fitted over the air valve stem assembly and bonded in place. This collar positions and secures the valve stem in slots located in the tire's split rim, to allow the inner tube segments to be filled with air via its inflation tool.

FIGS. 7B, 7C, and 7D, show the aspects of the air chamber segment 14 and its seal 17, where the individual air chambers can be repaired when they are punctured even after they have been bonded into a closed volume, by cutting away the original seal 17 that had a wall thickness shown as "W-1" and replacing it with a seal with an "oversized" wall thickness shown as "W-2", where the difference between the two wall thickness is the amount of material that was allowed to cut the air chamber open to repair it. This concept assumes an adhesive would be used at all edges that mate along the internal edges of the individual "air chambers". The inflatable inner tube segment is re-bonded using the oversized seal which compensates for the material that was cut away during the repair operation. This restores the segment to its original size so it can fit inside of the tire casing. Several oversized seals can be made available to effectuate several repair operations. This prolongs the "life" for using these segments. Conventional tires are generally thrown away when their side walls are punctured or cut. The aspect of being able to repair the individually inflatable inner tube segments as disclosed in this figure eliminates this problem.

FIGS. 8, 8A, and 8B show the aspects of the aforementioned individually inflatable air chambers in the inner tube segments, where an inflation tool 19 allows the individual air chamber's valve stems 9, 10, 11, and 12 to be filled simultaneously or deflated in the same manner via the check valve system 49 located inside each valve stem.

Figure 9A:
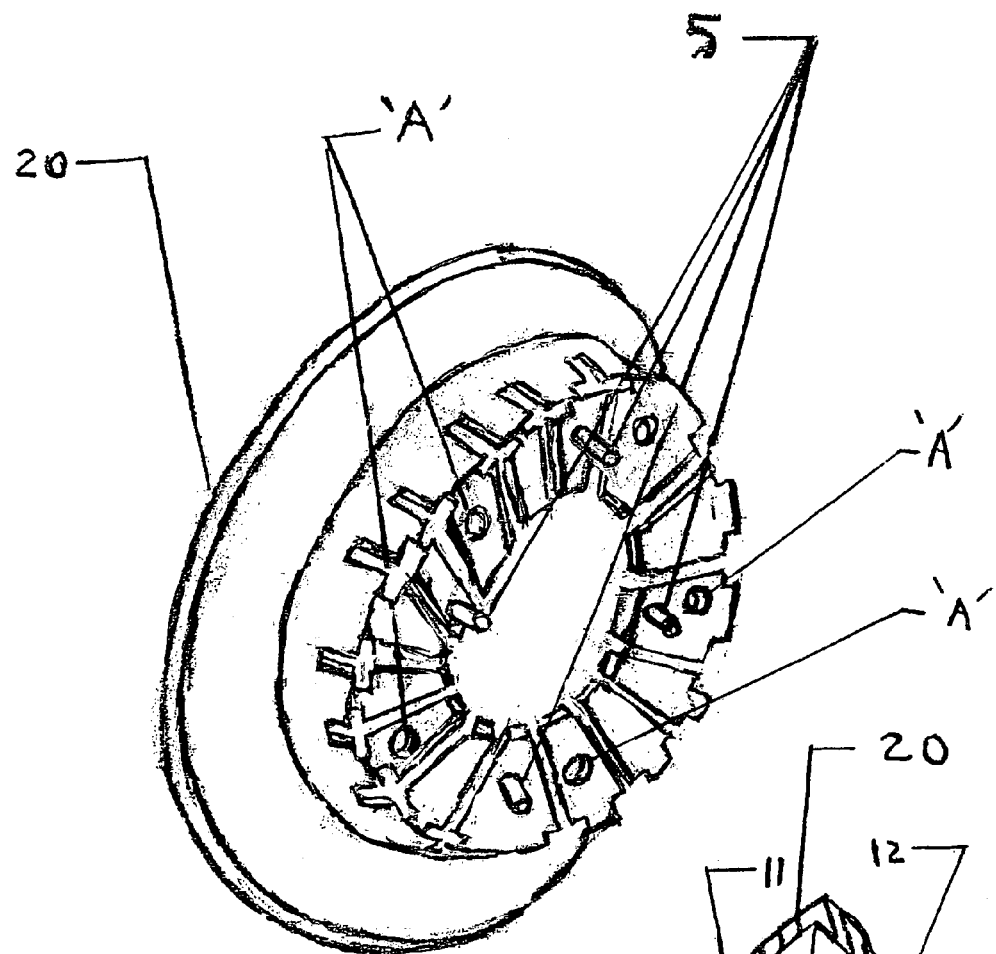
FIGS. 9A and 9B show how the air filler valve stem is held in place by slots in one half of the split rim.
Figure 9B:
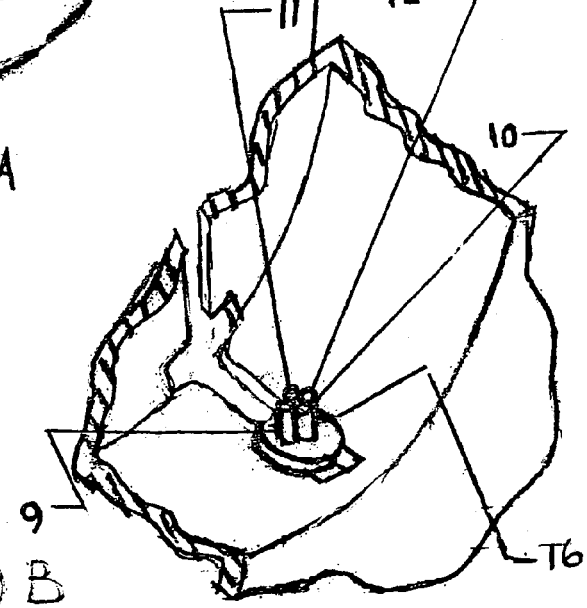

FIGS. 9, 9A, and 9B show how the split rims 20 and 22 I are installed onto the Modular Tire by sliding into the tire's inside diameter capturing the valve stems 9, 10, 11, and 12 of the inflatable inner tube segments 13 and 14 through the use of the valve stem collars 16, that keep the valve stems from being pushed inside the tire when the inflation tool is pressed against the valve stem openings. The in-board rim half 22 is bolted to the out-board rim half 20 via the rim mounting studs 5 that are pressed into the hub if the out-board rim half 20, where these studs are arranged to pass through the "B" holes located in the hub of the in-board rim 22, and locking nuts 49 are installed onto these studs to clamp the hubs of the two rims together. (surface-to-surface). FIG. 9 also shows the "A" holes that are used to mount the Modular Tire (wheel) to the vehicle in the conventional manner.

FIG. 9C shows the Modular tier's wheel cover 4, that hides the valve stems after the inner tube segments are inflated. This cover is not needed if the valve stem location is reversed, by having the slots that allow the valve stems to pass through the rim, located on the in-board rim 22 (see FIG. 9 for the definition of in-board).

Figure 10:
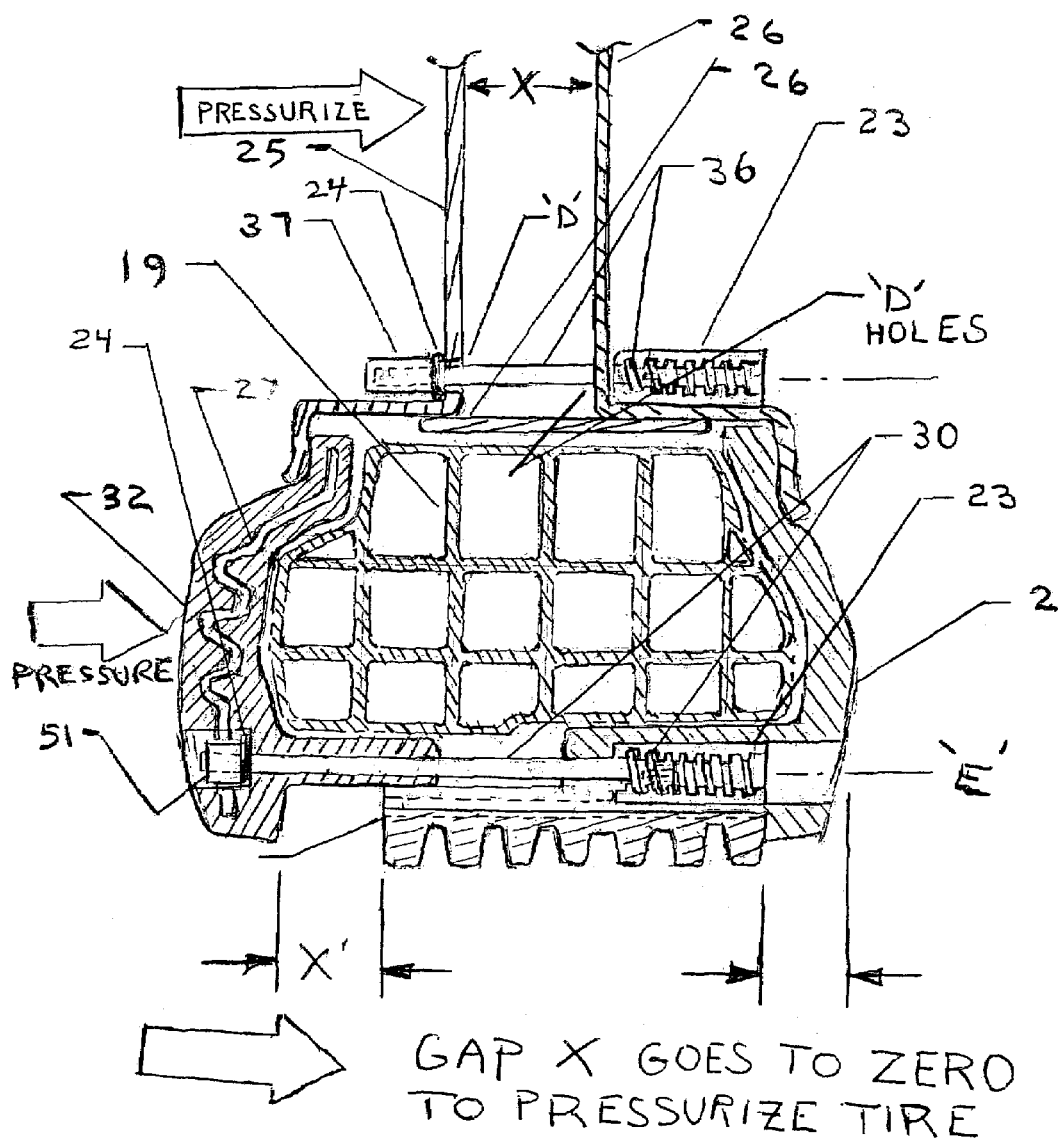
FIG. 10 shows the tire with an inner tube made of molded-in "Air Chambers", and the mechanism that holds the inner tube/tire into the configuration of a standard tire, after it has been squeezed in a hydraulic press to build pressure.

FIG. 10 shows a variation of the invention that has its inner tube molded to fit the tire casing, where the inner tube has individual "air cells" molded inside of the body of the tube. The inner tube's girth is purposely designed "oversized" by the amount "X", as shown in this figure. This tire variation uses "Jacking Screws" 30 and 36, assisted by a Hydraulic Press (or equivalent device) to squeeze the side walls of the tire together, where the amount of travel "X", is required to squeeze the tire until its split rim hubs 25 and 26 meet "surface-to-surface". The rim hub 26 is part of a "fixed rim", that does not move. The Jacking Screws 30, are located around the perimeter of the tire's "fixed rim" 26 (this rim has about 15 evenly-spaced "Jacking Screws" and tire's side wall has 15 "Jacking Screws" also). When the movable rim 25 is squeezed until its hub touches the fixed rim 26 the retainers of the "Jacking Screws" protrude past the surface of the hub of the sliding rim 26 by the amount "X". These retainers are brought back "flush" to the surface of the hub by backing the "Jacking Screws" out of their sleeves 23, where these sleeves have internal Acme screw threads and the "Jacking Screws" have external Acme threads machined into the contour of their heads. The "Jacking Screws" lock the rims together when the Hydraulic Press is removed. FIG. 10 also shows a spring like device 27 molded into the tire side wall of the tire. This device is a ring-shaped structure that is intended to stiffen/strengthen this particular side wall 32 because it moves inward to squeeze the inner tube containing the "air cells", which resist this movement because of the pressure build-up inside of the "air cells". This stiffener 27 is shown in FIG. 12A more clearly, where the side wall is removed.

Figure 10A:
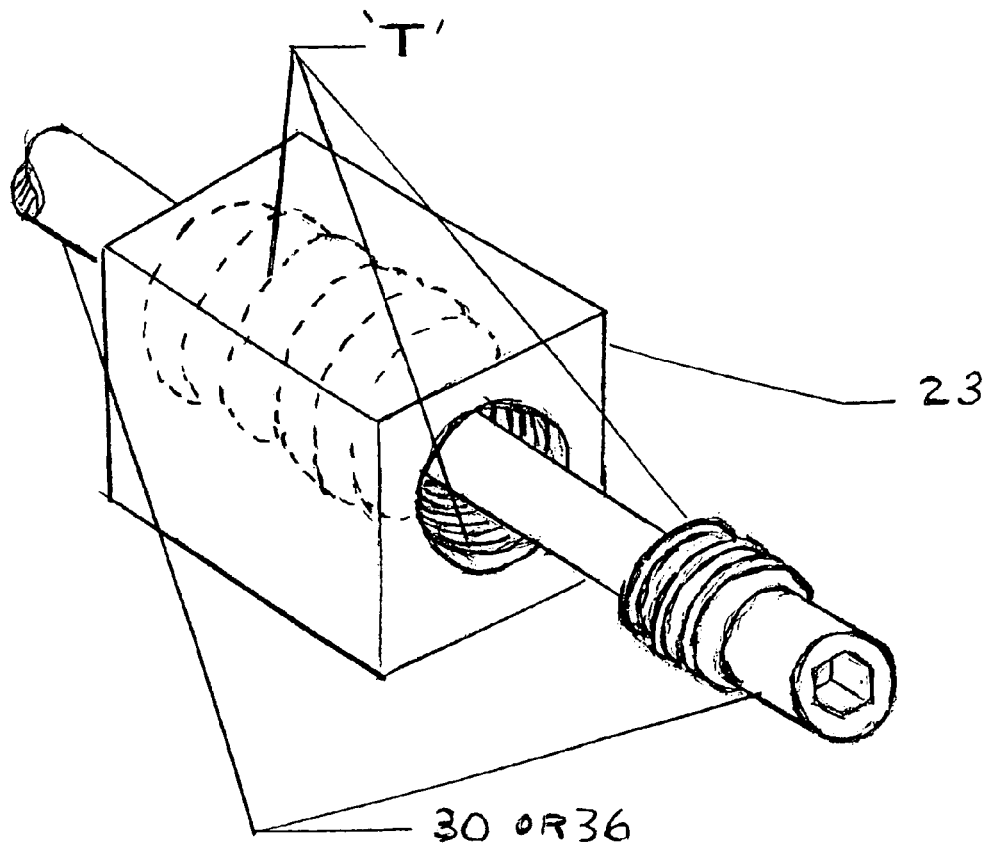
FIG. 10A shows the special bolt that holds the squeezed tire/inner tube in the configuration of a standard tire.

FIG. 10A shows the "Jacking Screw" 30 and 36 having the Acme screw threads ("T") machined into the contour of the screw head and machined inside of the threaded sleeve 23, respectively. The threaded sleeves are fixed to the rim of the wheel 26 and fixed inside of the holes around the perimeter of the side wall 2 as shown in FIG. 10, or may be seen as "C" holes and "E": holes in FIG. 5A, where the stiffener 27 is also shown more clearly.

Figure 11B:
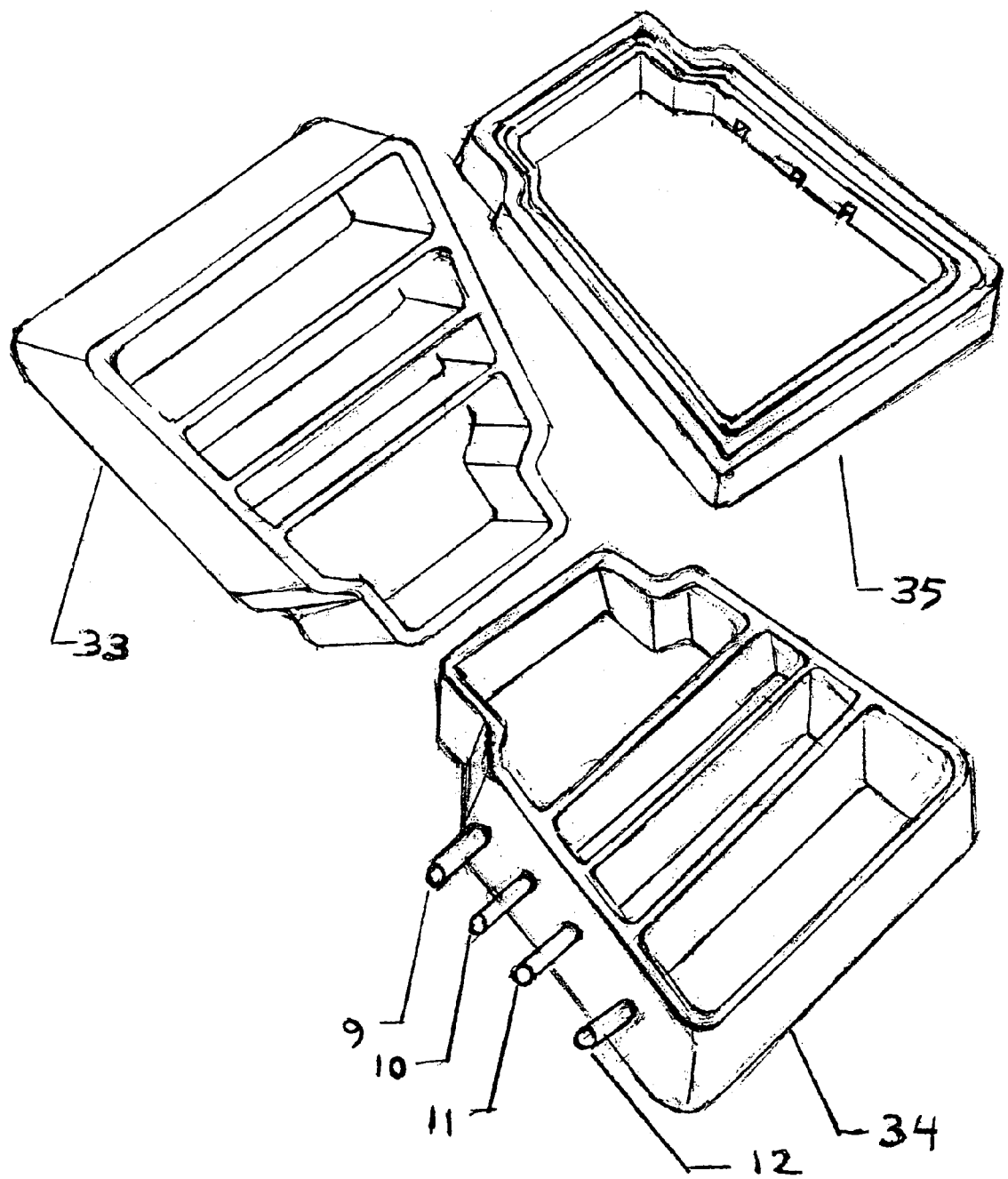
FIGS. 11B and 11C show the details of the inflatable inner tube segment with valve stems on its side, and the cross section of this inflatable inner tube segment installed into a tire with the valve stems passing through the side wall.

FIGS. 11, 11A, and 11B show the aspects of an array of inflatable inner tube segments 33 and 34 that differ from those shown in FIG. 10, by having their valve stems located on the side of the inner tube segments. This circular array of inflatable inner tube segments can be placed inside a tire casing having a matching hole pattern as the valve stems shown 9, 10, 11, and 12, where the material around these holes is reinforced. These holes would be usually located in the side wall of the tire that is regarded as the in-board side wall. The inner tube segments would be inflated, using the tool like the one shown in FIG. 11A, where all of the "air cells" of each inner tube segment is inflated simultaneously. This tool may have an Air Pressure Gauge as an integral part, to assure proper inflation pressure.

Figure 11C:
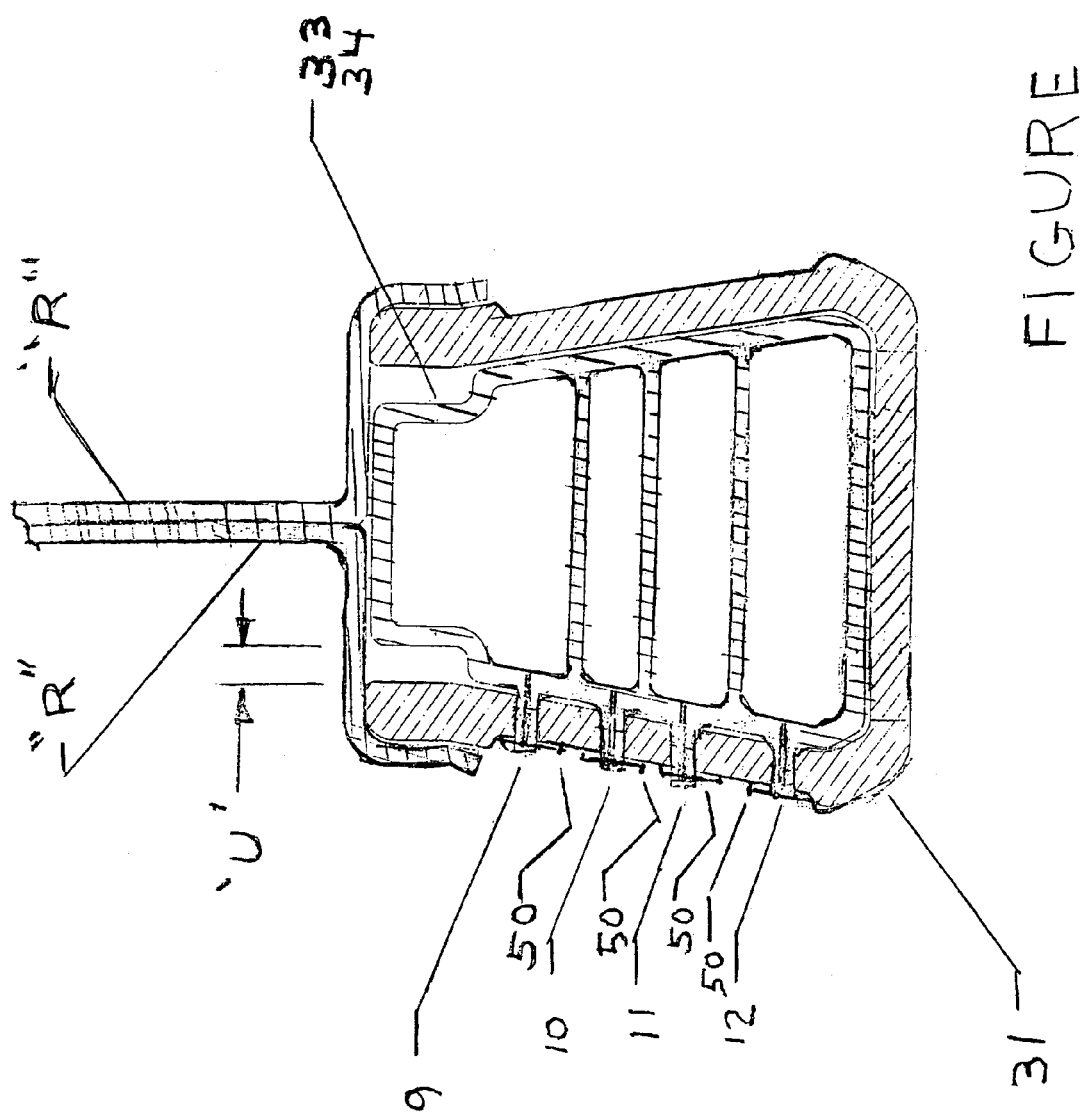

FIG. 11C shows the inflatable inner tube section mounted inside a tire. The tire may be either a Modular Tire as defined in this invention disclosure, or a Consumer's (existing) tire that has been "re-worked" by adding the hole pattern for the valve stem pattern that matches the circular array of inflatable inner tube segments. This figure shows valve stem retainers 50 that are installed after the inflatable inner tube segments 33 and 34 have been installed into the tire casing. These retainers also keep the valve stems from being pushed inside the tire by the inflation tool 19 as the inner tube segments are being inflated. This figure also shows an undercut "U" at the upper end of the inflatable inner tube segment. This undercut is to allow these inner tube segments to be installed inside conventional tires (after the valve stem hole pattern has been drilled into the tire's side wall), using the tools that are used with a conventional Tire Mounting Machine. This means the consumer can use his own conventional rims 15 un-modified, and his own tires that are slightly "re-worked" (modified via adding the valve stem holes), not having to discard or sell them.

Figure 12:
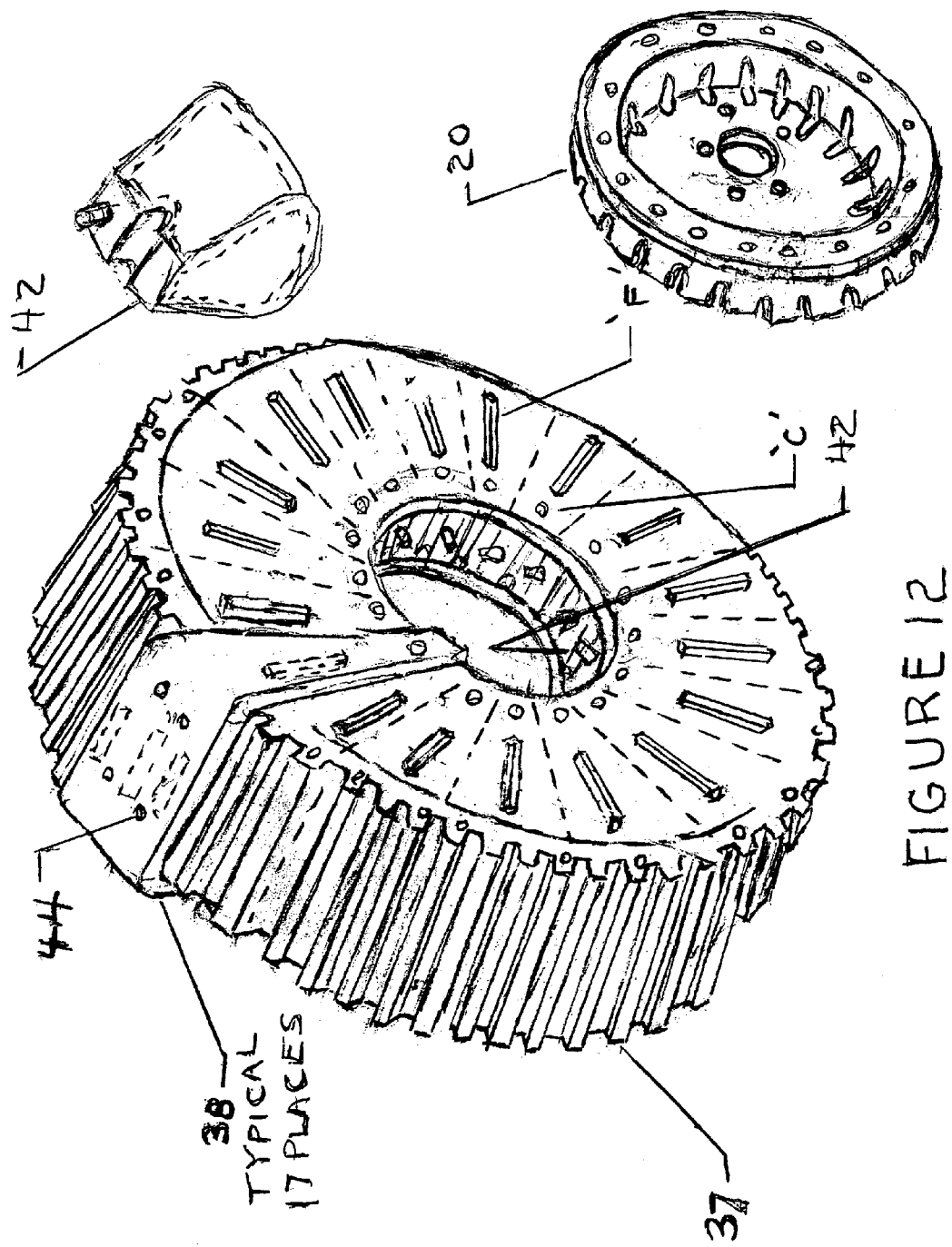
FIG. 12 shows the invention configured as a Modular tire with individual treads that can be replaced.

FIG. 12 shows the invention having novel replaceable treads 38 that are attached to the tire casing via fasteners such as "Nylock" (self-locking screws) Screws. This figure shows the replaceable treads also being "anchored" by Anti-slip fins "F" (or the like) that are molded into the replaceable treads, and the tire casing.

FIGS. 12A and 12B show another type of replaceable tread 38, that is secured to the tire casing 6 by "Nylock" Screws (or the like). The figure shows the spring-like side walls 27 similar to the tires used on the Lunar Rover, to make up a Modular tire that should be able to operate on paved roads, due to the tire's replaceable tread feature. FIG. 12 B also shows a type of tire similar to the one used in the Lunar Rover, except its hollow tire casing structure 39 and 40 is made Vulcanized Fiber (a tough, flexible, in-expensive material, or a moldable/spring-like material similar or equal) that is covered with Ductile Aluminum Foil 46 that makes the casing "Fire Proof", and able to be colored with many "Cosmetic" finishes.

FIG. 12C shows the Modular tire in a "clam-shell" configuration, where the tread and part of the tire's side wall are molded together. These two "shells" 51 and 52 can be attached to the aforementioned Lunar Rover-type tire casings or the reinforced rubber-type casing 6 shown in FIG. 3, or the like.

Figure 13:
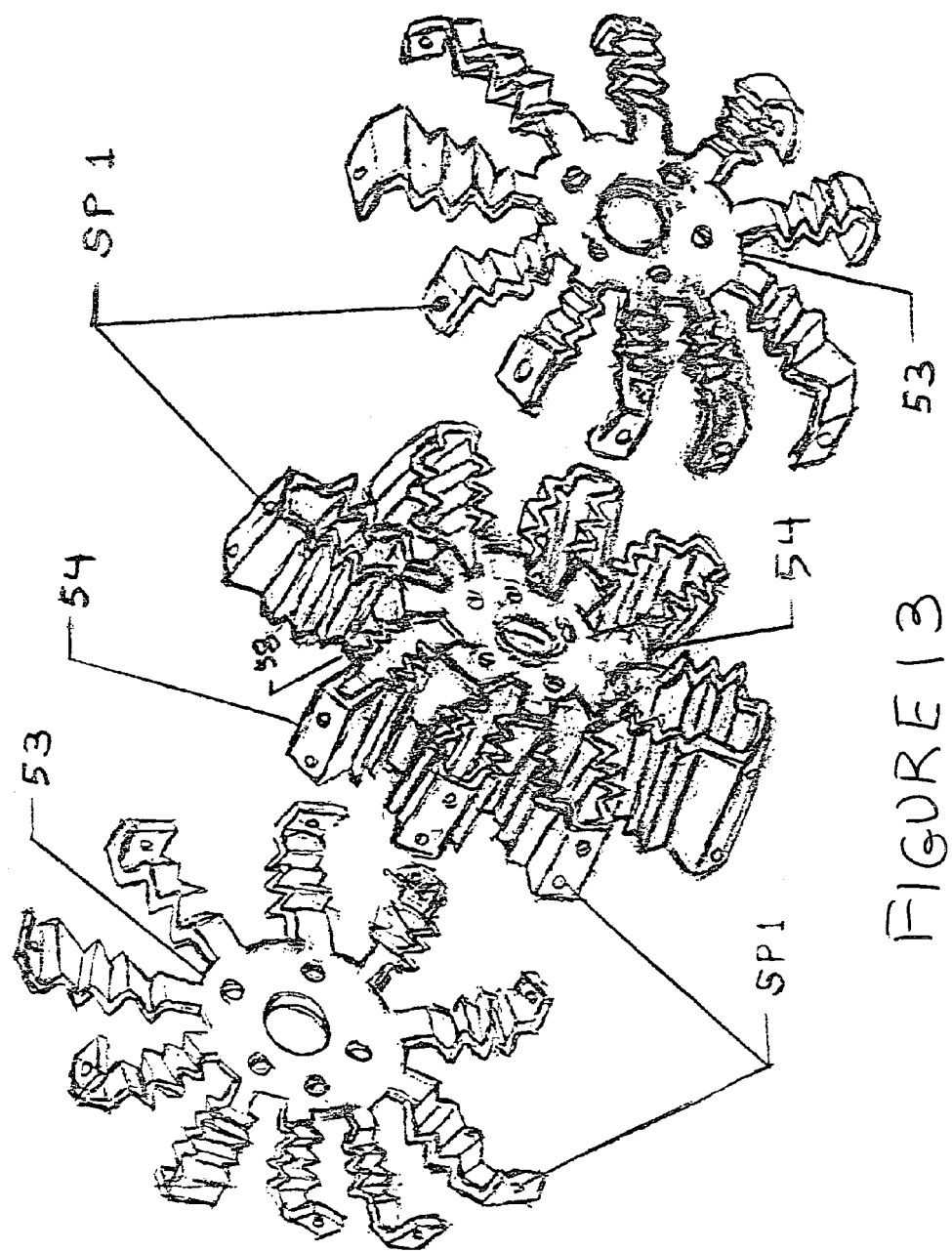
FIG. 13 shows the invention as a Lunar Rover-type wheel/"airless wheel" made from spring-like material(s).

FIG. 13 shows the detailed aspects of the Lunar Rover-type wheel, where it has three spider-like "spring action" elements, being a central spider 54 "captured between two outside spiders 53, using pop-rivets or the like to hold the assembly together at the "SP-1" holes, located around the assembly's outer perimeter. A pair of center hubs 58 is bonded or welded to the central spider 54 to allow the wheel to be mounted to the contemplated vehicle.

Figure 13A:
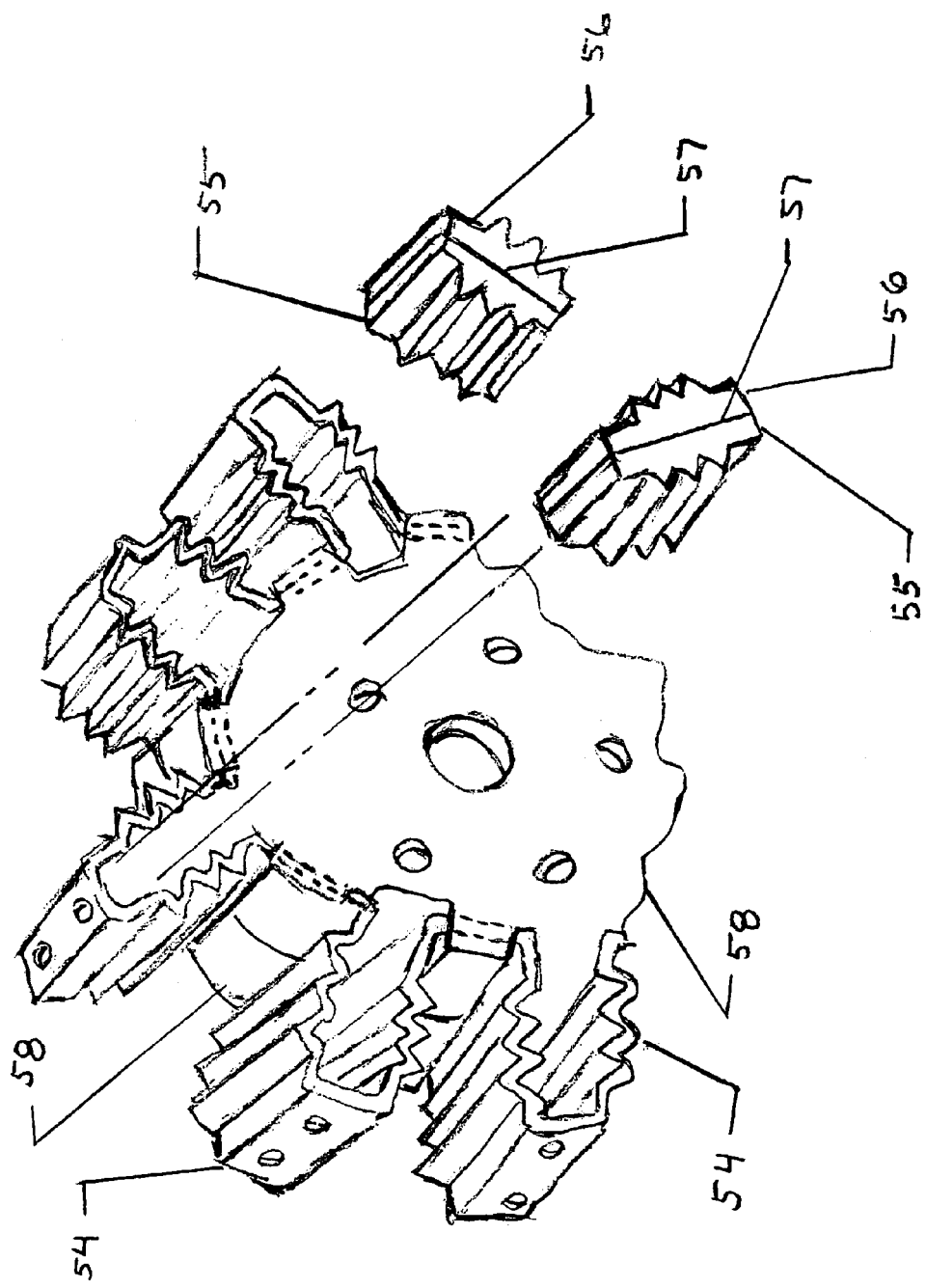
FIG. 13A shows the Lunar Rover/"airless wheel" with inflatable "load-carrying boosters" (Foam Rubber or the like) inner tube segments installed inside the spring-like Lunar Rover-type wheel.

FIG. 13A shows this Lunar Rover-type/"spring-action" wheel being converted from an "airless" wheel to one assisted by the inflatable inner tube-like segments 55 shaped like bellows. These bellows are placed into the spring section of the central spider to give the springs of the central spider more load-carrying capability. These bellows may have a "fixed" inflation pressure by being a single "air Cell" that is inflated at the factory, or may be a variable inflation pressure system by having air valves and individually inflatable "air cells" in each inner tube-type segment.

Figure 14:
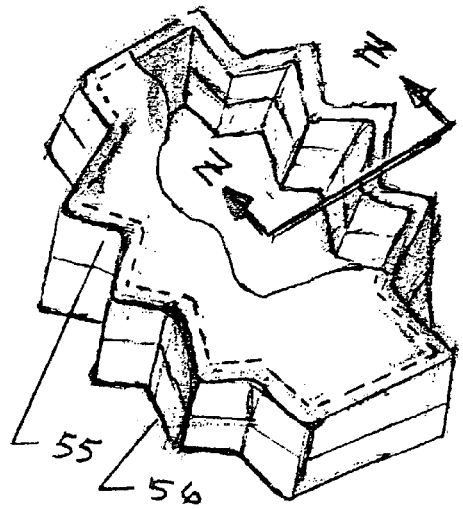
FIG. 14 shows the inflatable inner tube section that is used as a "load-carrying booster" for the spring-like wheel.
Figure 14A:
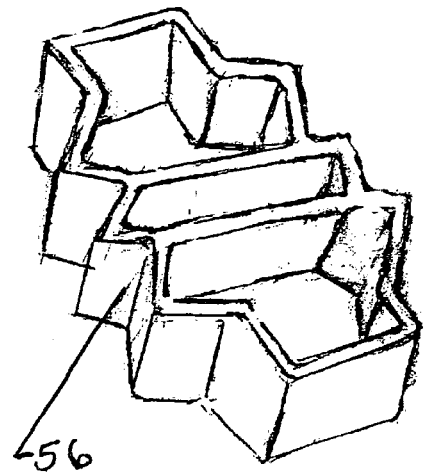
FIG. 14A shows one-half of the "clam shell" (the inside chamber) that is used as the inflatable inner tube segment.
Figure 14C:
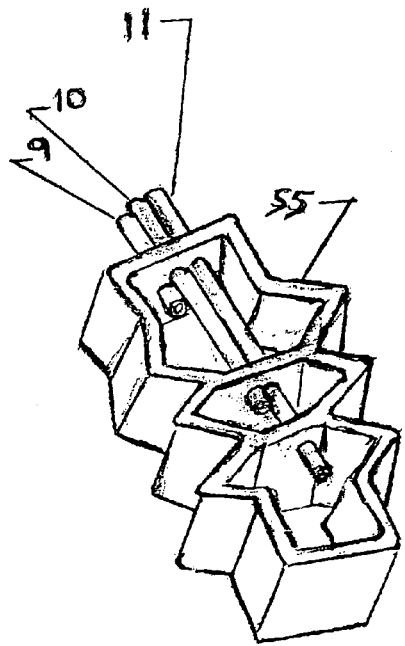
FIG. 14C shows a variation of the inner tube segment ("load-carrying booster") with individual inflatable chambers.
Figure 14B:
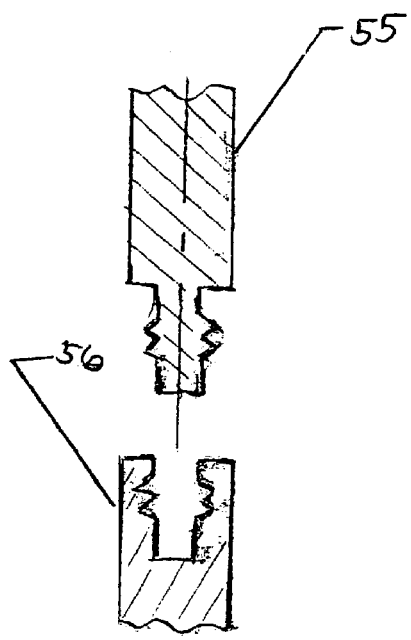
FIG. 14B shows the "tongue-in-groove" (ribbed edge in channel) method of sealing the two halves of the inner tube segment (in the configuration of a "clam shell") by pressing or pressing/bonding their edges together.

FIGS. 14, 14A, 14B and 14D show the inflatable inner tube-type segment 55 and 56 with air filler valves 57, 58, and 59 passing through the walls of the "air chamber(s). FIG. 14B shows the aspects of the "tongue-in-groove" edge seal along the mating edges of the bellows, that result from the "clam shell" configuration that the bellows were molded into. The air-tight seal along the edges of the "clam shell"-type bellows is accomplished by a "press fit" that forces the "ribbed" bead along the edges of one half of the "clam shell" (called the tongue) into the ribbed channel along the edges (called the groove) of the mating half of the "clam shell" (bellows). This seal may be a "dry seal", relying only upon the friction and bearing pressure created at the tongue-in groove interface, or an adhesive may be applied to the tongue-in-groove, to effectuate the "air-tight" seal. The splitting open of the "clam shell" and subsequent re-sealing, can be done by cutting the unit apart along the seal, and re-sealing it with an adhesive, if an adhesive is initially used. If no adhesive is used, the unit may be pulled apart, and resealed by pressing it together.

Figure 15:
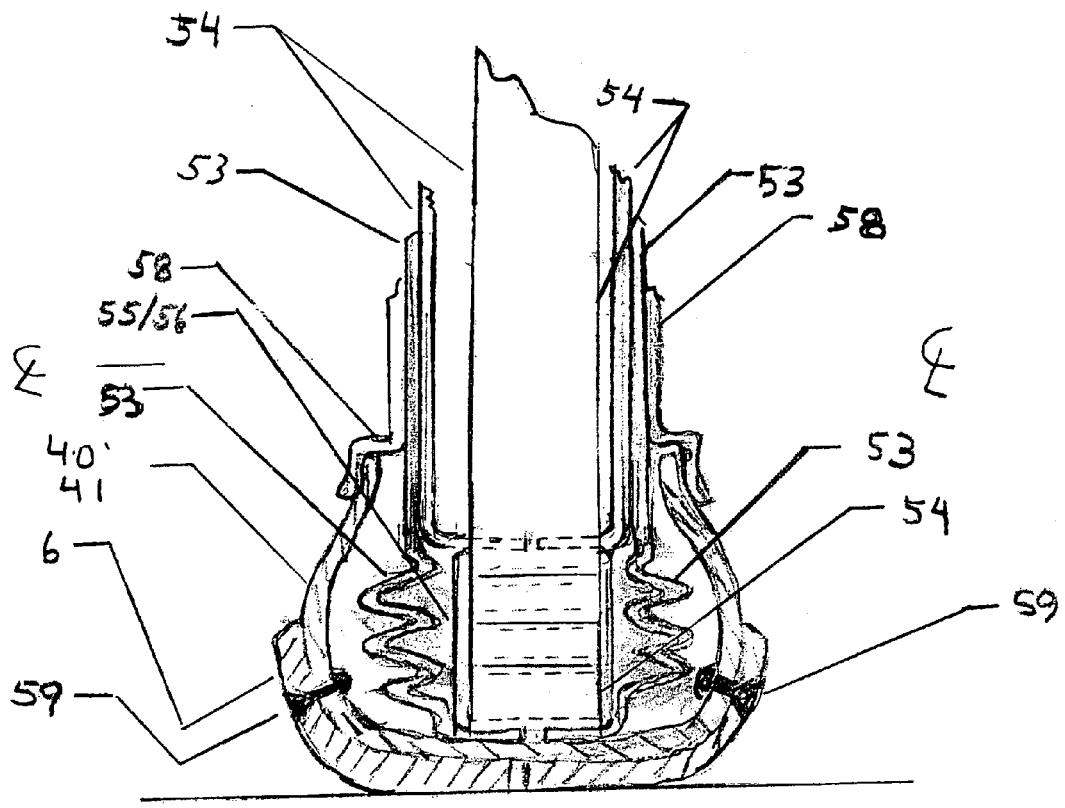
FIG. 15 Shows a cross-section of the assembly of Lunar Rover-type wheel, with the "load-carrying boosters" installed inside of the spring-like wheel, and the replaceable tire tread installed onto the outside surface of the wheel.
Figure 15A:
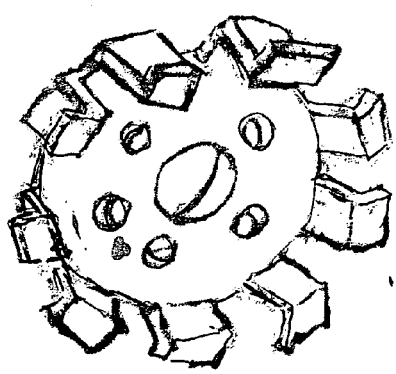
FIG. 15A shows one-half of the "clam shell-type" hub that holds the middle element of the Lunar Rover-type wheel.
Figure 15B:
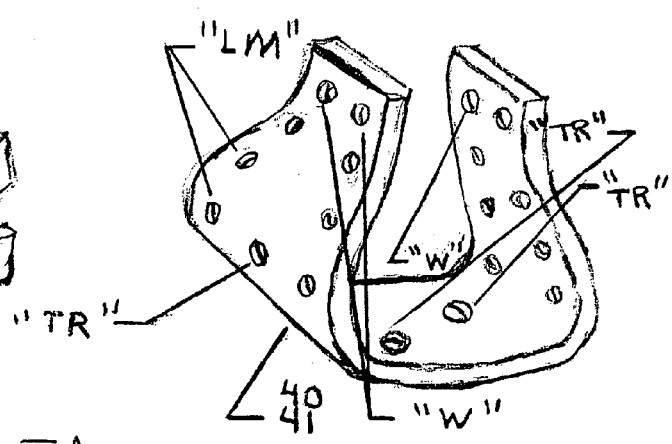
FIG. 15B shows one of the segments of the Lunar Rover-type wheel, and the mounting hole pattern for installing subsequent segments of the wheel and holes for installing the replaceable tire tread.

FIGS. 15 and 15A shows a typical cross-section of the Lunar Rover-type Modular Wheel assembled. The basic elements of this wheel are the outer spiders 53, the center spider 54, the split wheel-mounting hubs 58, the replaceable tire tread 6, the segments of the Lunar Rover-type tire casing 40 and 41, and the array of Nylock fastening screws 59 that are used around the perimeter of the replaceable tire tread. FIG. 15B shows the mounting holes "TR" that are used to attach the Nylock fasteners to the [tire tread/Lunar Rover-type wheel segments. FIG. 15B also shows the mounting hole pattern, designated as "LM", that is used to attach/construct the Lunar Rover-type tire casing, by pop-riveting (or the like) consecutive tire segments 40 and 41 together to for a circular tire casing. The pre-defined split rim (pre-defined in other variations of the invention) mounts to the Lunar Rover-type wheel at the circular hole pattern defined in FIG. 15B, as "W" holes, where each half of the split rim mounts through this hole pattern from opposing sides of the Lunar Rover-type wheel assembly, as shown in FIG. 15, where the split rims 58 are shown on each side (left and right side) of the tire casing.

The instant invention has been shown and described herein in what is considered to be the most practical and preferred embodiment. It is recognized however that departures may be made therefrom within the scope of the invention and that obvious modifications will occur to a person skilled in the art.

Some of the advantages of the present invention include, but are not limited to, the following:

1. The Modular Tire has a re-useable tire casing because it never comes in contact with the pavement.
2. The invention has a replaceable tire tread that can be easily installed by removing the fasteners that hold the tread to the tire casing, and that these tire treads are further secured to the tire casing by having "grooves" and "fins" or the like to provide non-slip surfaces between mating surfaces of the tire's components, that may experience dynamic forces while operating.
3. The Modular Tire invention has variations of the method that the tire does not "go flat" or "blow out", ranging from: (1) inner tube-type components mounted inside the tire casing, where each inner tube-type segment has independent "air cells", (2) "airless" tire casings made from formed "spider-like' structural members, assembled into a wheel, that have spring-like characteristic that are patterned after NASA's Lunar Rover wheels, but have a replaceable tire tread and have "ride characteristics" that are similar to those of conventional inflated tires.
4. This "airless" Lunar Rover-type wheel has a variation which has inflatable inner tube-like "bellows" that are used to increase the tire's resiliency and load-carrying capability.
5. The invention aspect of having replaceable tire treads has a feature that allows the used tread to be continuously "re-treaded" and re-installed. This is accomplished by using a matrix of self-locking "Nylock" Fasteners (a thread-locking screw, or any similar positive-locking/"quick disconnecting" fastener that a Technician, working for a Tire Company or Tire Dealer, can remove/re-use to remove the worn tire tread and replace with a new tire tread element.
6. The invention also includes tire tread elements that might be an innovation in the tire industry. These replaceable tire treads are composed of only the basic part of the tire that contacts the road. This could save weight and cost, as compared to conventional tires.
7. The invention's replaceable tire tread aspect allows many types of tire tread elements to be installed onto the same tire casing, for example treads designed for Rain, Mud and Snow, High Speed, Long Wear, Racing, and most of the popular other applications associated with the types of tires sold, commercially.
8. The invention can be also used for some aircraft applications. This would increase safety in "take-off" and landings, and save the airplane owners money because of the invention's replaceable tread aspects.

9. The invention has internal components such as "air cells" can be combined with its novel tire casings, where these tire casing variations and aspects result in having spring-like characteristics of conventional inflated tires, but feature a novel use of new, lightweight, inexpensive, non-flammable materials, that are not used in existing tires. The "air cells" used in the "modular tires" of this invention can be either "fixed air pressure" like the "air cells" of closed-cell Foam Rubber or Plastic, or the "air cells" can have variable air pressure through its inflatable "air cell" inner tube-type segment variations.

10. The invention has a variation of its Modular Tire that derives tire inflation pressure from squeezing an "oversized" inner tube-like structure that has its own internal matrix of independent "air cells", and the amount of required air pressure is adjusted by tightening or loosening the matrix of Jacking Screws, located around the perimeter of the tire tread perimeter and rim. This variation has the "anti-flat-tire feature designed into its over-sized "air cell inner tube", where these "air cells" are so numerous that only a few are punctured if the tire encounters normal road hazards that are related to flat tires. Another novel feature of this variation is the tire never has to be repaired because only a few of the "air cells" were affected. These "air cells" can range from closed cell Foam Rubber, Bubble Wrap, and the like, to precision molded inner tube-type segments that are inflated via a filled valve having multiple nozzles.

11. The invention has a novel "multi-cell air filler valve" design and corresponding "multi-cell air filler tool/nozzle" that allows many "air cells" to be filled simultaneously. This tool can be arranged to fill the individual cells of each inner tube-type segment simultaneously, or it can fill all of the segments of the wheel (tire mounted to its rim) simultaneously by assembling these air filler tools into a matrix/manifold that matches the air valve pattern of the various configurations of the Modular Wheel in this invention.

12. The invention can be used to convert a consumer's existing tires into "anti-flat tire" units by having a unique variation of invention's inflatable inner tube-type segments and accompanying split rims, designed for tires existing in the present industry, installed into their tires. The inner tube-type inflatable segments can be transferred to subsequent tires, on a continuous basis, and the segments are repairable, with respect to punctures in the individual inflatable segments. These segments can be removed from the tire and opened up to patch the "air cell", in a method similar to repairing conventional inner tubes. The inner tube-type segments have a unique "clam shell"-type design that allows them to be opened along their seam for repair, and subsequently re-sealed, and then re-installed into the tire casing.

13. The invention has the re-sealing capability of each of the aforementioned "clam shell"-type inflatable inner tube segments by either using the appropriate adhesive along the edges of the mating "clam shell", or employing a unique sealing feature that uses a "ribbed tongue-in-groove" configuration along the edges of the "clam shell" that allows the edges to be pressed together and locked by friction/bearing pressure. The locking feature is reversible, where the "clam shell" can be pried open via a tool or by hand, to effectuate repair from punctures. The urgency of effectuating repairs is not significant because each Modular Tire, having the aforementioned inflatable inner tube segments installed into the tire casing has a great number of cumulative "air cells" inside the tire, and a puncture in one or a few of the "air cells" should barely affect the Modular Wheel's performance, when installed onto a vehicle.

14. The invention has design aspects to also allow a customer to use his existing rims (wheels) with a modular tire that has the unique variation, where the tire is composed of the circular array of inflatable inner tube-type segments with the air filler valves passing through the side walls of the tire. It may also be possible to convert a consumer's existing tires to this configuration by "drilling" the hole pattern for the air filler valves into his tires. The structural integrity of the modified side wall would not be critical because the individual inflatable inner tube-type segments do not depend upon the tire's side wall being "air tight".

15. The inflatable inner tube-type segments can be inflated by the aforementioned air filling tool, or it can be inflated using a "needle' (or "needle matrix") combined with a "tire sealant"-type coating on the inner walls of the individual :air chambers", that allows them to be filled at the factory or Tire Dealership. The sealant would eliminate repairs from most punctures in the "air cells", associated with use on a vehicle.

16. The Modular Tire that has a wheel cover to hide the circular matrix of air filler valves passing through its rim, may also be used without the wheel cover if the wheel is mounted to the vehicle with these valves facing in-board, where the valves would not be visible. Once the tire is inflated, the need for access to these valves is rare, and the elimination of the covers saves weight, with respect to the wheel.

What is claimed is:

1. A modular tire assembly, comprising:

a tire casing having a replaceable tire tread, a first side wall and a second side wall, said replaceable tire tread captured by said first side wall and said second side wall, said tire casing defining a tire interior area;

an inflatable member having a plurality of inflatable inner tube segments disposed within said tire interior area, each inflatable inner tube segment separate from all other inflatable inner tube segments, each inner tube segment inflated and deflated independent from all other said inner tube segments, each inner tube segment having a plurality of internal inflatable air cells which are in a stacked configuration with respect to each other; wherein each of said plurality of internal inflatable air cells disposed within each inner tube segment being separate and independent from all other internal inflatable air cells of each inner tube segment, wherein each of said plurality of internal inflatable air cells within each of said plurality of inner tube segments are independently inflatable and deflatable from all other internal inflatable air cells;

a plurality of air valves, wherein each air valve of said plurality of air valves is assigned to a specific one of said plurality of inflatable inner tube segments, wherein each air valve having a plurality of air tubes, each of said plurality of air tubes in communication with a specific one of said plurality of inflatable air cells for a specific inner tube segment;

a pair of split rims, each of said pair of split rims having a hub member inserted within an central opening defined by said first side wall, said second side wall and said inflatable member; and means for connecting said pair of split rims to each other.

2. The modular tire assembly of claim 1 wherein said means for connecting said pair of split rims comprises:
a plurality of rim-mounted studs and associated nuts connecting the hub members together such that an outer flange portion of a first of said pair of split rims abuts an outer surface portion of said first side wall adjacent the central opening and an outer flange portion of a second of said pair of split rims abuts and outer surface portion of said second side wall adjacent the central opening.

3. The modular tire assembly of claim 2 wherein each of said plurality of inflatable inner tube segments having an air filler valve stem and at least one of said pair of split rims having a plurality of slots; wherein when said first split rim and said second split rim are connected together each air filler valve stem protrudes through one of said plurality of slots.

4. The modular tire assembly of claim 1 wherein the independent air tubes for all independent air cells for a single inner tube segment are brought together at one end to form an air filler valve stem of a particular air valve of said plurality of air valves having a plurality of independent air travel chambers.

5. The modular tire assembly of claim 1 wherein each of said plurality of internal inflatable air cells having inner walls which are coated with a sealant.

6. A modular tire, comprising:
a tire casing having a replaceable tire tread, a first side wall and a second side wall;
means for attaching and detaching said replaceable tire tread to said first side wall and said second side wall to define a tire interior area; and
at least one inflatable inner tube segment disposed within said tire interior area, said at least one inflatable inner tube segment having a plurality or internal stacked inflatable air cells, each of said internal inflatable air cells being separate and independent of all other internal air cells wherein each of said plurality of internal inflatable air cells within each of said at least one inner tube segment are independently inflatable and deflatable from all other internal inflatable air cells;
at least one air valve, wherein each air valve of said at least one air valve assigned to a specific one of said at least one inflatable inner tube segment, wherein each air valve having a plurality of air tubes, each of said plurality of air tubes in communication with a specific one of said plurality of inflatable air cells for a specific inner tube segment;
wherein a plurality of said inflatable inner tube segments are disposed within said tire interior area with each inner tube segment provided with said plurality of internal stacked inflatable air cells, each of said internal inflatable air cells within each tube segment are separate and independent from all other internal inflatable air cells within each tube segment.

7. The modular tire of claim 6 wherein each of said plurality of internal inflatable air cells within each of said plurality of inner tube segments are independently inflatable and deflatable from all other internal inflatable air cells.

8. The modular tire of claim 7 wherein each of said plurality of internal inflatable air cells having inner walls which are coated with a sealant.

9. A modular tire assembly, comprising:
a tire casing having a first side wall having a first hole pattern disposed along its outer circumference, a second side wall having a second hole pattern disposed along its outer circumference and a replaceable tire tread, said replaceable tire tread including a third hole pattern disposed along a first side for alignment with said first hole pattern and a fourth hole pattern disposed along a second side for alignment with said second hole pattern;
means for attaching and detaching said replaceable tire tread to said first side wall and said second side wall to define a tire interior area;
an inflatable member having a plurality of independent inflatable inner tube segments disposed within said tire interior area, each inflatable inner tube segment separate from all other inflatable inner tube segments, each inner tube segment inflated and deflated independent from all other said inner tube segments, each of said plurality of independent inflatable inner tube segments having a plurality of internal inflatable air cells which are in a stacked configuration with respect to each other; wherein each of said plurality of internal inflatable air cells disposed within each inner tube segment being separate and independent from all other internal inflatable air cells of each inner tube segment, wherein each of said plurality of internal inflatable air cells within each of said plurality of inner tube segments are independently inflatable and deflatable from all other internal inflatable air cells;
a plurality of air valves, wherein each air valve of said plurality of air valves is assigned to a specific one of said plurality of inflatable inner tube segments, wherein each air valve having a plurality of air tubes, each of said plurality of air tubes in communication with a specific one of said plurality of inflatable air cells for a specific inner tube segment;
a pair of split rims, each of said pair of split rims having a hub member inserted within an central opening define by said first side wall, said second side wall and said inflatable member, each of said pair of split rims having a plurality of slots on its hub member, wherein each air valve of said plurality of air valves is captured within an aperture defined by a particular slot on a first of the pair of split rims and a particular slot on a second of the pair of split rims when said pair of split rims are connected together; and
means for connecting said pair of split rims to each other.

10. The modular tire assembly of claim 9 wherein said means for attaching comprises a plurality of bolts and captive nuts; wherein once the hole patterns are properly aligned each one of said plurality of bolts is inserted through a corresponding hole in said first hole pattern, said second hole pattern, said third hole pattern and said fourth hole pattern and once properly inserted said associated captive nut is securely disposed on the inserted end of said bolt.

11. The modular tire assembly of claim 10, wherein the number of plurality of bolts and captive nuts provided corresponds to the number of hole patterns of either said first hole pattern, said second hole pattern, said third hole pattern or said fourth hole pattern.

12. The modular tire assembly of claim 9 wherein each of said plurality of internal inflatable air cells for each inner tube segments having its own air inflation mechanism to produce a plurality of independent air inflation mechanisms for each inner tube segments, wherein the independent air inflation mechanisms are brought together at one end to form an air filler valve stem having a plurality of independent air travel chambers; wherein each of said air travel chambers is in communication with a particular inflatable air cell for a particular inner tube segment.

13. The modular tire assembly of claim 9 wherein each of said plurality of inflatable inner tube segments having an air filler valve stem and at least one of said pair of split rims having a plurality of slots; wherein when said first split rim and said second split rim are connected together each air filler valve stem protrudes through one of said plurality of slots.

14. The modular tire assembly of claim 9 wherein each of said plurality of internal inflatable air cells having inner walls which are coated with a sealant.

* * * * *